United States Patent
Andermo

(10) Patent No.: US 6,400,138 B1
(45) Date of Patent: Jun. 4, 2002

(54) REDUCED OFFSET HIGH ACCURACY INDUCED CURRENT ABSOLUTE POSITION TRANSDUCER

(75) Inventor: Nils Ingvar Andermo, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/421,497

(22) Filed: Oct. 20, 1999

Related U.S. Application Data

(63) Continuation-in-part of application No. 09/213,268, filed on Dec. 17, 1998.

(51) Int. Cl.⁷ .............................. G01B 7/14; G01B 7/02
(52) U.S. Cl. ........................... 324/207.17; 324/207.12; 324/207.24; 324/207.25; 340/870.32; 336/45
(58) Field of Search .......... 324/207.25, 207.15–207.19, 324/207.12, 207.24; 336/45, 130, 131, 129, 75, 77, 79, 115; 340/870.32, 870.33, 870.35, 870.36; 318/653–657; 341/15

(56) References Cited

U.S. PATENT DOCUMENTS

| | | |
|---|---|---|
| 4,100,485 A | 7/1978 | Rogers |
| 4,103,322 A | 7/1978 | Phillips et al. |
| 4,150,352 A | 4/1979 | Pomella et al. |
| 4,420,754 A | 12/1983 | Andermo |
| 4,697,144 A | 9/1987 | Howbrook |
| 4,893,077 A | 1/1990 | Auchterlonie |
| 5,291,782 A | 3/1994 | Taylor |
| 6,005,387 A | 12/1999 | Andermo et al. |
| 6,054,851 A | 12/1999 | Maserliez et al. |
| 6,157,188 A * | 12/2000 | Steinke ............. 324/207.17 |

FOREIGN PATENT DOCUMENTS

| | | |
|---|---|---|
| EP | 0872712 | 10/1998 |
| WO | WO 95/31696 | 11/1995 |
| WO | WO 97/19323 | 5/1997 |

OTHER PUBLICATIONS

Hitchcox, A., Assoc. Ed. "Linear Transducers for Position Feedback: The Variety of Designs Available Means One Is Probably Just Right For Your Application." .
"Farrand INDUCTOSYN Positions Transducers" Brochure.
"Heidenhain–Linear–Inductosyn" Brochure, Nov. 1988.

* cited by examiner

Primary Examiner—Jay Patidar
(74) Attorney, Agent, or Firm—Oliff & Berridge, PLC.

(57) ABSTRACT

A reduced offset absolute position transducer has at least one magnetic field generator that generates a first changing magnetic flux in a first flux region. A plurality of coupling loops have a first plurality of coupling loop portions spaced at a first wavelength along a measuring axis and a second plurality of coupling loop portions spaced at a second wavelength along a measuring axis. One of the first plurality of coupling loop portions and the second plurality of coupling loop portions are inductively coupled to a first changing magnetic flux from a transmitter winding in a first flux region to generate a second changing magnetic flux outside the first flux region in the other of the first plurality of coupling loop portions and the second plurality of coupling loop portions. A magnetic flux sensor is positioned outside the first flux region and is responsive to the second changing magnetic flux to generate a position-dependent output signal. The output signal varies at the first or second wavelength of the corresponding other of the first plurality of coupling loop portions and the second plurality of coupling loop portions that generates the second changing magnetic flux.

34 Claims, 11 Drawing Sheets

REDUCED OFFSET HIGH ACCURACY INDUCED CURRENT ABSOLUTE POSITION TRANSDUCER

This is a Continuation-in-Part of application Ser. No. 09/213,268 filed Dec. 17, 1998. The entire disclosure of the prior application(s) is hereby incorporated by reference herein in its entirety.

BACKGROUND OF THE INVENTION

1. Field of Invention

This invention relates to induced current linear and rotary absolute position transducers. In particular, this invention is directed to rotary and linear induced current absolute position transducers with improved winding configurations to increase the proportion of the useful output signal component, i.e., those related to transducer position, relative to extraneous ("offset") components of the output signal which are unrelated to transducer position.

2. Description of Related Art

Induced current position transducers typically have a read head that is movable relative to a scale member. The position transducer may have a read head with one or more transducers each having a transmitter winding and overlapping receiver windings. Each transducer will have a scale on the scale member. Each scale on the scale member includes a plurality of flux modulators. Importantly, the receiver windings of each transducer have a wavelength which is different from other receiver windings. Similarly, the flux modulators each have a length measured along the measuring axis, equal to one-half of the wavelength of the corresponding receiver winding.

Each transducer uses two overlapping receiver windings which are spaced one-quarter of a scale wavelength apart to provide output signals which are in quadrature. The signals output from the receiver windings are, therefore, 90 degrees out of phase with each other. The relation between the signals from the two receiver windings allows the direction of movement to be determined.

The signal amplitudes of the receiver windings follow a sinusoidal function as the scale moves along the measuring axis. Each of the receiver windings have loops with alternating winding directions. The receiver windings each have a first set of loops with a positive polarity and a second set of loops with a negative polarity which are individually positioned between each adjacent loop in the first set. Thus, the electromotive force (EMF) induced in the positive polarity loops has a polarity that is opposite to the polarity of the EMF induced in the negative polarity loops. The positive polarity loops generally enclose the same size area as the negative polarity loops and, thus, nominally the same amount of magnetic flux. Therefore, the absolute magnitude of the EMF generated in the positive polarity loops is nominally the same as the EMF generated in the negative polarity loops.

The number of positive polarity loops are also equal to the number of negative polarity loops. Thus, the positive polarity of EMF induced in the positive polarity loops is exactly offset by the negative polarity EMF induced in the negative polarity loops. Accordingly, the net nominal EMF on each of the receiver windings is zero and it is intended that no signal is output from the receiver windings as a result of the direct coupling from the transmitter windings to the receiver windings.

When the read head is placed in proximity to the scale, the changing magnetic flux generated by the transmitter winding also passes through the flux modulators. The modulators modulate the changing magnetic flux.

FIG. 1A shows the position-dependent output from the positive polarity loops as the flux modulators move relative to the positive polarity loops. Assuming the flux modulators are flux disrupters, the minimum signal amplitude corresponds to those positions where the flux disrupters exactly align with the positive polarity loops, while the maximum amplitude positions correspond to the flux disrupters being aligned with the negative polarity loops.

FIG. 1B shows the signal output from each of the negative polarity loops. As with the signal shown in FIG. 1A, the minimum signal amplitude corresponds to those positions where the flux disrupters exactly align with the positive polarity loops, while the maximum signal output corresponds to those positions where the flux disrupters exactly align with the negative polarity loops. It should be appreciated that if flux enhancers were used in place of flux disrupters, the minimum signal amplitudes in FIGS. 1A and 1B would correspond to the flux enhancers aligning with the negative polarity loops, while the maximum signal amplitude would correspond to the flux enhancers aligning with the positive polarity loops.

FIG. 1C shows the net signal output from either of the overlapping receiver windings. This net signal is equal to the sum of the signals output from the positive and negative polarity loops, i.e., the sum of the signals shown in FIGS. 1A and 1B. The net signal shown in FIG. 1C should ideally be symmetrical around zero, that is, the positive and negative polarity loops should be exactly balanced to produce a symmetrical output with zero offset.

However, a "DC" (position independent) component often appears in the net signal in a real device. This DC component is the offset signal $V_0$. This offset $V_0$ is an extraneous signal component which complicates signal processing and leads to undesirable position measurement errors. This offset has two major sources.

First, the full amplitude of the transmitter fields pass through the receiver windings. As outlined above, this induces a voltage in each loop. The induced voltage is nominally canceled because the loops have opposite winding directions. However, to perfectly cancel the induced voltage in the receiver windings requires the positive and negative loops to be perfectly positioned and shaped, for a perfectly balanced result. The tolerances on the balance are critical because the voltages induced directly into the receiver winding loops by the transmitter windings are much stronger than the modulation in the induced voltage caused by the flux modulators. In practice, fabrication tolerances always prevent perfect balance.

Second, the spatially modulated field created by the flux modulators also exhibits an average position-independent offset component. That is, the flux modulators within the magnetic field generated by the transmitter windings all create the same polarity spatial modulation in the magnetic field. For example, when flux disrupters are used, the induced eddy current field from the flux modulators has an offset because the flux disrupters within the transmitter fields all create a same polarity secondary magnetic field. At the same time, the space between the flux disrupters does not create a secondary magnitude field.

Thus, each positive polarity loop and each negative polarity loop of the receiver windings sees a net magnetic field that varies between a minimum value and a maximum value having the same polarity. The mean value of this function is not balanced around zero, i.e., it has a large nominal offset.

Similarly, when flux enhancers are used, the field modulation due to the flux enhancers has a bias because the enhancers within the transmitter windings all create the same field modulation, while the space between the modulators provides no modulation. Each positive and negative polarity loop of each receiver winding, therefore, sees a spatially modulated field that varies between a minimum value and a maximum value having the same polarity. The mean value of this function also has a large nominal offset.

A receiver winding having an equal number of similar positive and negative polarity loops helps eliminate the offset components. However, any imperfection in the balance between the positive and negative polarity loops allows residual offsets according to the previous description.

Both of these offset components are expected to be canceled solely by the symmetry between the positive and negative polarity loops in the receiver windings. This puts very stringent requirements on the manufacturing precision of the receiver windings. Experience in manufacturing the transducer indicates it is practically impossible to eliminate this source of error from an induced current position transducer.

SUMMARY OF THE INVENTION

This invention provides an induced current absolute position transducer with improved winding configurations that reduce the DC offset component of the output signal.

This invention further provides a "reduced offset" absolute induced current position transducer having a scale and a read head that are movable relative to each other along a measuring axis.

The improved winding configurations increase the proportion of the useful output signal component relative to extraneous ("offset") components of the output signal, without requiring increased transducer fabrication accuracy. Furthermore, the winding configurations enhance the degree of output signal change per unit of displacement for a given measuring range. Additionally, the improved winding configuration provides a reduced offset output signal in an absolute position transducer.

This is accomplished by winding configurations that minimize and nullify the extraneous coupling between the transmitter and receiver windings. The winding configurations also provide enhanced position-dependent coupling between the windings through a plurality of coupling windings on the scale which interact with a plurality of spatial modulations of the windings.

The read head includes at least one magnetic flux sensor. The read head further includes at least one magnetic field generator that is responsive to a drive signal to generate a first changing magnetic flux in a first flux region.

The scale member has a plurality of flux coupling loops extending along the measuring axis. The flux coupling loops include at least a first plurality of coupling loop portions and a second plurality of coupling loop portions. The first plurality of coupling loop portions are spaced along the measuring axis at a first wavelength and the second plurality of flux coupling loops are spaced along the measuring axis at a second wavelength that is different than the first wavelength. The flux coupling loops are responsive to the first changing magnetic flux in one of the first plurality of coupling loop portions and the second plurality of coupling loop portions to generate a second changing magnetic flux outside the first flux region and in the other of the first plurality of coupling loop portions and second plurality of coupling loop portions.

The read head of the reduced-offset inductive absolute position sensor also includes a magnetic flux sensor that is positioned outside the first flux region. The magnetic flux sensor is responsive to the second changing magnetic flux to generate an output signal which is a function of the relative position between the magnetic flux sensor and the flux coupling loops. The output signal varies at the first or second wavelength of the corresponding other of the first plurality of coupling loop portions and the second plurality of coupling loop portions that generate the second changing magnetic flux. The output signal varying at the first wavelength is compared to the output signal varying at the second wavelength to provide a coarse (or synthetic) wavelength that defines the extent of the absolutely measurable distance. The measurable distance may be extended by counting successively traversed coarse wavelengths.

One exemplary embodiment of this invention has flux coupling loops which have at least two portions. In this exemplary embodiment, each of the two portions are spaced on a scale member at one-half of the corresponding one of the two wavelengths along the measuring axis. The first portions of the coupling loops extend into a first flux region. A transmitter winding generates a first changing flux in the first flux region and the first changing flux induces a current in the first portions of the flux coupling loops. The induced current passes through the second portions of the coupling loops which are positioned in a second flux region which is spatially offset from the first flux region. The induced current in the second portions generates a spatially modulated secondary changing magnetic flux in the second flux region. The coupling loops spatially modulate the secondary magnetic flux at the wavelength at which every other one of the corresponding coupling loop portions are spaced along the measuring axis. A flux sensor in the second flux region senses the secondary magnetic flux to generate a position-dependent output signal.

A second transmitter winding may be positioned in the second flux region while a corresponding second receiver winding is positioned in the first flux region. The second transmitter winding may then be selectively energized so that the second receiver winding generates a position-dependent output signal that varies with the wavelength at which every other one of the first loop portions are spaced along the measuring axis. Therefore, at least two different wavelength outputs are generated by using the same flux coupling loops. Thus, the different wavelengths enable an absolute position sensing system. Also, because the same set of coupling loops generate two different wavelengths, a high degree of space efficiency is achieved.

These and other features of this invention are described in or are apparent from the following detailed description of various exemplary embodiments of reduced-offset transducers according to this invention.

BRIEF DESCRIPTION OF THE DRAWINGS

Various exemplary embodiments of reduced-offset transducers according to this invention will be described in detail, with reference to the following figures, wherein.

DETAILED DESCRIPTION OF PREFERRED EMBODIMENTS

U.S. Pat. No. 5,886,519, incorporated herein in its entirety, discloses an induced current absolute position transducer. The 519 patent also discloses associated signal processing techniques for an induced current absolute position transducer which may be used in a reduced offset induced current absolute position transducer in accordance with the present invention.

Figure 2:
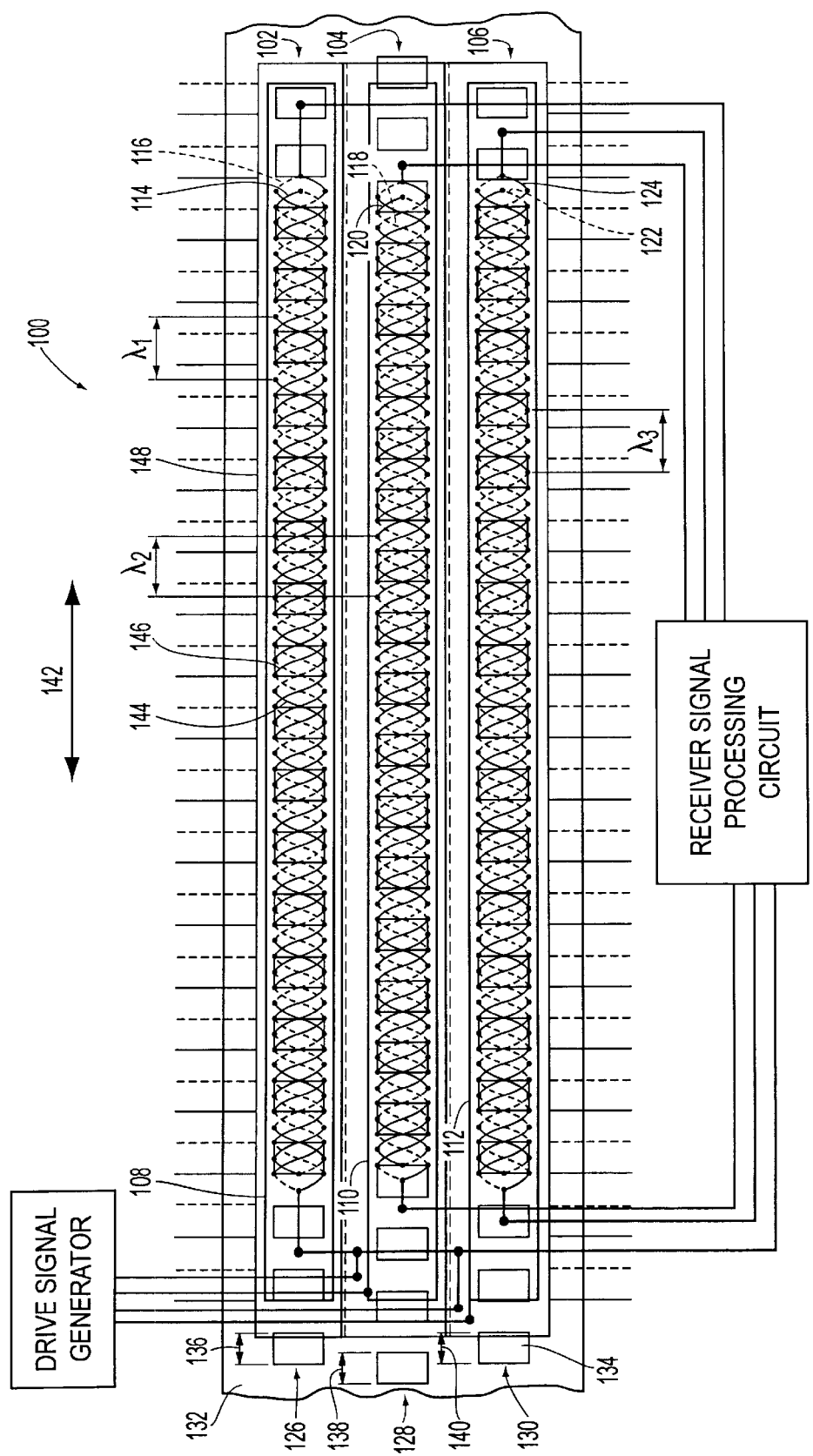
FIG. 2 shows an absolute position transducer having undesirable extraneous signal offset components.

FIG. 2 generally shows the operation of the induced current absolute position transducer of the 519 patent. As shown in FIG. 2, the induced current absolute position transducer 100 includes a read head 148 that is movable relative to a scale 132. The scale 132 and the read head 148 are preferably formed on printed circuit boards using standard printed circuit board technology.

The inductive absolute position transducer 100 includes three transducers 102, 104 and 106 on parallel tracks. Each of the three transducers 102, 104 and 106 includes a transmitter winding 108, 110 and 112, respectively, and two overlapping receiver windings 114 and 116, 118 and 120, and 122 and 124, respectively. Each transducer 102, 104 and 106 also includes a scale 126, 128 and 130. The scales 126, 128 and 130 are formed on a scale member 132 of the inductive absolute position transducer 100. Each scale 126, 128 and 130 includes a plurality of flux modulators 134. Importantly, the receiver windings 114 and 116, 118 and 120, and 122 and 124 of the transducers 102, 104 and 106, have wavelengths of $\lambda_1$, $\lambda_2$ and $\lambda_3$, respectively. Similarly, the flux modulators 134 on the scales 126, 128 and 130 each has a length 136, 138 and 140, respectively, measured along the measuring axis 142, equal to one-half of the corresponding wavelength $\lambda_1$, $\lambda_2$, and $\lambda_3$.

FIG. 2 shows several vertical lines equally spaced apart at the wavelength $\lambda_3$, with the half wavelength markings indicated by dashed lines. The vertical lines and the dashed lines provide a visual reference to help indicate how the wavelengths $\lambda_1$ and $\lambda_2$ differ from the wavelength $\lambda_3$.

Preferably, the wavelength $\lambda_1$ equals 2.54 mm, the wavelength $\lambda_2$ equals 2.4094 mm and the wavelength $\lambda_3$ equals 2.56 mm. Either of the transducers 102 and 106 can be used to provide a fine wavelength measurement. The wavelength $\lambda_3$ (2.56 mm) is particularly useful for millimeter measurements because it allows for simple digital calculations. The wavelength $\lambda_1$ (2.54 mm) is equal to 0.1 inches. Thus, it is used in inch measurements, because it allows for simple inch/millimeter conversion calculations.

The wavelengths $\lambda_1$, $\lambda_2$, and $\lambda_3$ have values with small differences from each other. Thus, the spatial phase difference between pairs of these wavelengths changes along the scale and goes through a full 360° cycle over a spatial length much longer than any of the individual wavelengths $\lambda_1$, $\lambda_2$ or $\lambda_3$. Accordingly, position output information from two transducers with different wavelengths, such as two of the transducers 102, 104 and 106, can be combined for long-range measurements.

The combined position information provides absolute position information, based on a spatial "phase relation" computation, over a "medium wavelength" or "coarse wavelength." This "medium" or "coarse" wavelength corresponds to 360° of relative spatial phase shift, and is derived from the spatial wavelengths of the two transducers. This "medium" or "coarse" wavelength is much longer than the range of absolute measurement that could be achieved by any of the transducers 102, 104 or 106 alone.

As the spatial wavelengths of two transducers become increasingly similar, the phase difference derived from signals from the two transducers goes through a full 360° cycle over an increasingly longer "phase relation" wavelength. This corresponds to a larger absolute measuring range.

The permissible practical relationship between the wavelengths of the transducers 102, 104 and 106, and thus the total absolute measuring range of the device, is dependent on the measurement accuracy for each of the three wavelengths/transducers. A high measurement accuracy for an individual transducer indicates that positions can be accurately determined to a resolution that is a small part of the transducer wavelength.

"Interpolation ratio" describes the degree to which sub-wavelength resolution or accuracy can be obtained. That is, it is the ratio of the wavelength to the chosen increment of position resolution. This term may be applied to the wavelength of an individual transducer, or to the effective "medium" or "coarse" wavelengths described above.

In the inductive absolute position transducer 100 shown in FIG. 2, the inductive absolute position transducer 100 must be constructed with a very conservative "error margin" for the relative phase computations. That is, under the worst case conditions, the "medium" or "coarse" relative phase computation must identify the position of the relatively moving transducer elements corresponding to a particular individual wavelength of the "next finer" measurement mode of the absolute system. Otherwise, an error, corresponding to at least one wavelength of the "next finer" measurement mode, will be created in the overall absolute position computation. "Wavelength ratio" means the ratio of the relatively coarser effective wavelength to the "next finer" effective wavelength, for example, Coarse/Medium, or Medium/Fine.

For the inductive absolute position transducer 100 of FIG. 2, a conservative error margin is obtained by using a wavelength ratio that is low compared to the interpolation ratio of the individual transducers. The wavelength ratios used in the various exemplary embodiments of the inductive absolute position transducer of this invention discussed herein are only 16/1 for Medium/Fine and 8/1 for Coarse/

Medium. These wavelength ratios provide an adequate safety margin versus the nominal accuracy and interpolation ratio of 256/1 expected for the individual transducers 102, 104 and 106, and their associated fine wavelengths. The wavelength ratios can be increased depending on system design tolerances and allowable costs. However, this could result in a greater risk of errors causing incorrect absolute measurement readings.

The phase difference between the wavelengths $\lambda_1$ and $\lambda_3$ provides an effective coarse wavelength of 325.12 mm. To provide a medium wavelength $\lambda_M$, the difference between the 2.56 mm wavelength $\lambda_3$ and the 2.4094 mm wavelength $\lambda_2$ provides a wavelength of 40.96 mm, which is equal to 16×2.56 mm and 17×2.4094 mm. Thus, the Coarse/Medium ratio is 325.12/40.96, or approximately 8. The Coarse/Fine ratio is 325.12/2.54=128 or 325.12/2.56=127. It should be appreciated that, to ensure the inductive absolute position transducer has a sufficient measuring range, the Coarse/Fine ratio is preferably at least 100, while the Medium/Fine ratio is preferably at least 10. The following quantitative description summarizes the design guidelines corresponding to the fine (millimeters and inches), medium and coarse operating modes used in the various exemplary embodiments of the inductive absolute position transducer according to this invention that are discussed herein.

In particular, the wavelengths $\lambda_1$, $\lambda_2$ and $\lambda_3$ are: $\lambda_1$=2.54 mm; $\lambda$=2.4094 mm; and $\lambda_3$=2.56 mm. The spatial phase position of each transducer 102, 104 and 106 is defined as $\phi_1$, $\phi_2$ and $\phi_3$, respectively. The wavelengths $\lambda_1$ and $\lambda_3$ are the fine mode wavelengths $\lambda_F$. The wavelength $\lambda_3$ is used for millimeter fine mode measurements. The wavelength $\lambda_1$ is used for inch fine mode measurements. The medium mode wavelength $\lambda_M$ is determined as:

$$\lambda_M = \lambda_3 * \frac{\lambda_2}{\lambda_3 - \lambda_2}$$

Thus, the medium mode wavelength $\lambda_M$ is 40.96 mm. The coarse mode wavelength $\lambda_C$ is determined as:

$$\lambda_C = \lambda_1 * \frac{\lambda_3}{\lambda_3 - \lambda_1}.$$

Thus, when $\lambda_1$ is 2.54mm and $\lambda_3$ is 2.56 mm, the coarse mode wavelength $\lambda_C$ is 325.12 mm.

The phase position for the coarse wavelength $\lambda_C$ is $\phi_1$–$100_3$. The phase position for the medium wavelength $\lambda_{M3}$ is $\phi_2$–$100_3$. The calculation of the general phase position $\phi_n$ is defined below. The phase position for either fine wavelength $\lambda_1$ or $\lambda_3$ is determined by quadrature, as described below.

The transmitter windings 108, 110 and 112 and the receiver windings 114 and 116, 118 and 120, and 122 and 124 of the transducers 102, 104 and 106, respectively, are preferably manufactured on two layers of a single printed circuit board, as described above.

As noted above, each transducer 102, 104 and 106 uses two receiver windings 114 and 116, 118 and 120, and 122 and 124, respectively. By being one-quarter of a scale wavelength apart, the receiver windings are in quadrature. The signals output from the receiver windings are, therefore, spatially 90° out of phase. The relation between the signals from the two receiver windings allows the direction of movement to be determined and allows an unambiguous fine position measurement to be calculated anywhere within a fine wavelength.

In the inductive absolute position transducer 100 of FIG. 2, the signal amplitudes of the receiver windings follow a sinusoidal function as the scale 132 moves along the measuring axis 142. The linear and phase positions x and $\phi_n$, respectively, within one local wavelength of the scale relative to the corresponding receiver windings are obtained as:

$$x = \tan^{-1}(s1/s2) * (\lambda_n/360°)$$

$$\phi_n = \tan^{-1}(S_{n1}/S_{n2})$$

where:
 x is the linear position;
 $\phi_n$ is the spatial phase position, where n=1, 2 or 3 for transducers 102, 104 or 106, respectively;
 $S_{n1}$ and $S_{n2}$ are the amplitude of the output signals from the corresponding receiver windings; and
 $\lambda_n$ is the corresponding wavelength.

The $\tan^{-1}$ function returns an angle between 0° and 360°, by using the signal polarity of the $S_{n1}$ and $S_{n2}$ signals to identify the appropriate "quadrant" of the wavelength that corresponds to the signals.

Additionally, in these embodiments, the length of the receiver windings of each transducer 102, 104 and 106 should be the integer number of wavelengths which comes closest to the medium wavelength $\lambda_M$. Preferably, the medium wavelength $\lambda_M$ will be equal to an integer number of wavelengths for each transducer 102, 104 and 106. However, at most two of the transducers 102, 104 and 106 will have integer numbers of wavelengths equal to the medium wavelength $\lambda_M$.

Figure 3:
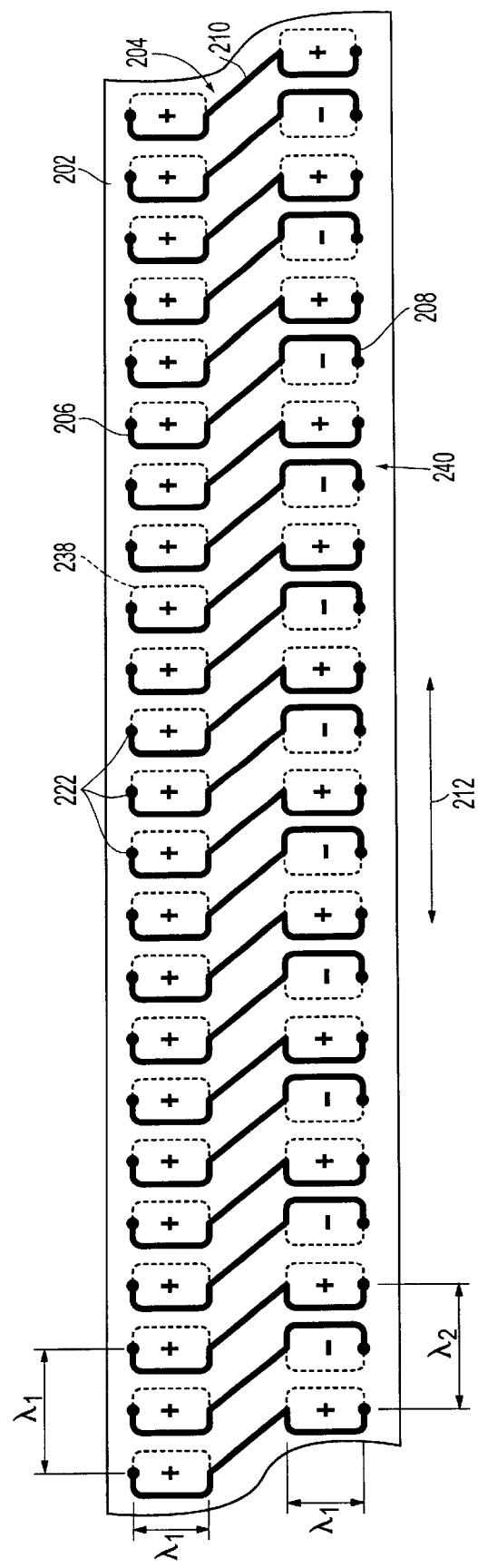
FIG. 3 shows a scale of a first embodiment of the reduced offset induced current absolute position transducer in accordance with this invention.
Figure 4:
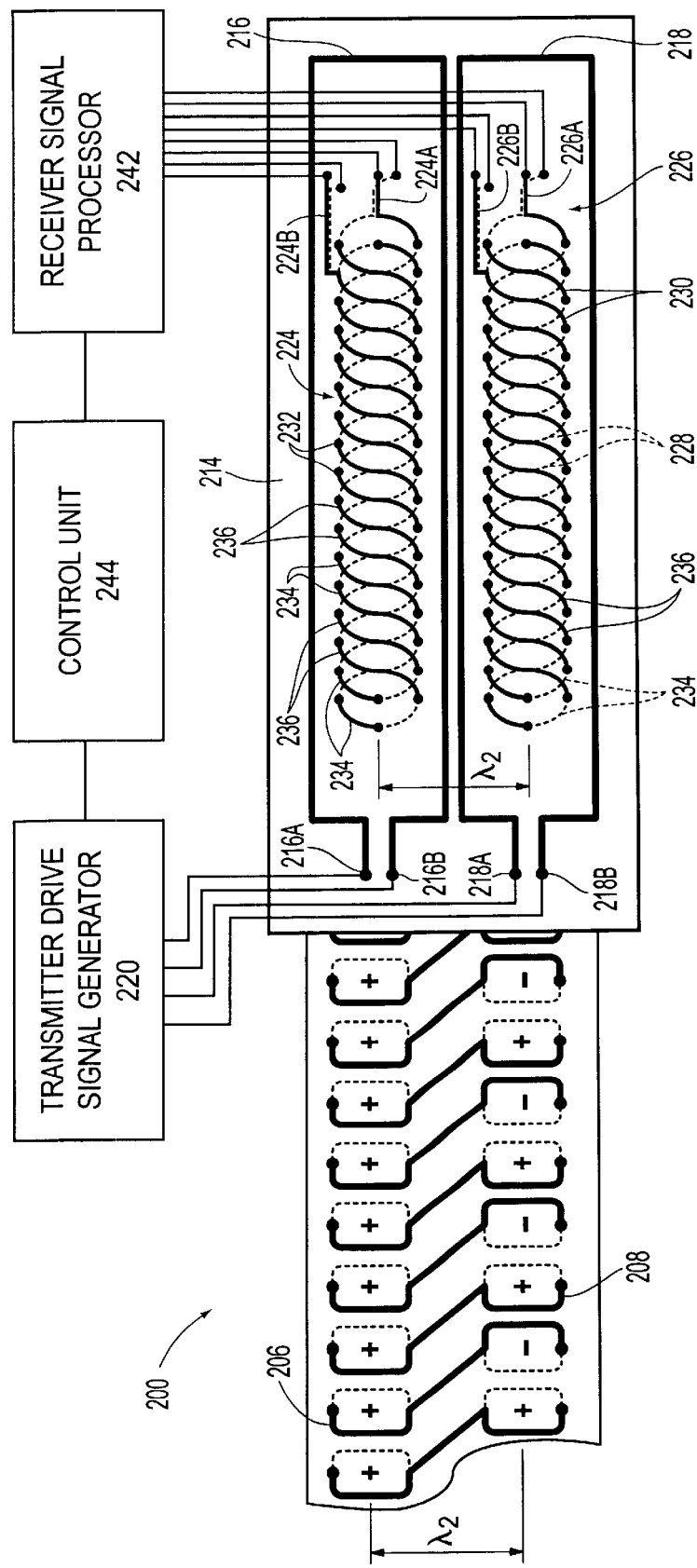
FIG. 4 shows the first embodiment of the reduced offset induced current absolute position transducer in accordance with this invention.

FIGS. 3 and 4 show a first exemplary embodiment of a reduced-offset induced current absolute position transducer 200 according to this invention. The reduced-offset induced current transducer 200 produces an output type usually referred to as "absolute". "Absolute" means that the transducer 200 produces a cyclic output that is not repeated across the extent of the transducer displacement. In particular, FIG. 3 shows a first exemplary embodiment of the reduced-offset scale 202 of the transducer 200. As shown in FIG. 3, the reduced-offset scale 202 includes a plurality of closed-loop coupling loops 204. Each of the coupling loops 204 is electrically isolated from the others of the coupling loops 204.

Each of the plurality of coupling loops 204 includes a first loop portion 206 and a second loop portion 208 connected by a pair of connecting conductors 210. The first loop portions 206 are arranged along one lateral edge of the scale 202 and are arrayed along the measuring axis 212. The second loop portions 208 are arranged along a second lateral edge of the scale 202 and are arrayed along the measuring axis 212. The connecting conductors 210 extend generally perpendicularly to the measuring axis 212 to connect the first loop portions 206 to the second loop portions 208.

As shown in FIG. 4, the read head 214 of the transducer 200 includes a first transmitter winding 216 and a second transmitter winding 218. As shown in FIG. 4, the first transmitter winding 216 is provided at a first lateral edge of the read head 214, while the second transmitter winding 218 is provided at the other lateral edge of the read head 214. Each of the transmitter windings 216 and 218 have the same long dimension extending along the measuring axis 212.

The terminals 216A and 216B of the first transmitter winding 216 and the terminals 218A and 218B of the second transmitter winding 218 are connected to the transmitter drive signal generator 220. The transmitter drive signal generator 220 selectively outputs a time-varying drive signal to either the first transmitter winding 216 or the second transmitter winding 218. Thus, either a time-varying current flows through the first transmitter winding 216 or through the second transmitter winding 218.

As shown in FIG. 4, in response to the transmitter drive signal generator 220 applying a time-varying drive signal causing a clockwise current to flow at an instant in time in the first transmitter winding 216, the first transmitter winding 216 generates a magnetic field that descends into the plane of FIG. 4 inside the first transmitter winding 216 and rises up out of the plane of FIG. 4 outside the loop formed by the first transmitter winding 216. In response, a counterclockwise current is induced in the first loop portions 206 that counteracts the change of magnetic field.

Thus, the induced current in each of the first loop portions 206 flows in a direction opposite to the current flowing in the adjacent first transmitter winding 216. As shown in FIG. 4, adjacent ones of the second loop portions 208 have loop currents having opposite polarities. Thus, a secondary magnetic field is created having field portions of opposite polarity periodically distributed along the measuring axis across the second loop portions 208 of the scale 202. The wavelength $\lambda_2$ of the periodic secondary magnetic field is equal to the distance at which the second loop portions 208 having similar current direction are spaced.

In response to the drive signal generator 220 applying a time-varying drive signal causing a clockwise current to flow at an instant in time in the second transmitter winding 218, the second transmitter winding 218 generates a primary magnetic field that descends into the plane of FIG. 4 inside the second transmitter winding portion 218 and rises up out of the plane of FIG. 4 outside the loop formed by the second transmitter winding 218. In response, a counterclockwise current is induced in the second loop portions 208 that counteracts the change of magnetic field.

Thus, the induced current in each of the second loop portions 208 flows in a direction opposite to the current flowing in the respective adjacent second transmitter winding 218 and adjacent ones of the first loop portions 206 on the other edge of the scale 214 have loop currents having opposite polarities. Thus, a secondary magnetic field is created having field portions of opposite polarity periodically distributed on the other edge of the scale. The wavelength $\lambda_1$ of the periodic secondary magnetic field is equal to the distance at which the first loop portions 206 of equal current direction are spaced.

The read head 214 includes first and second receiver winding groups 224 and 226. The first receiver winding group 224 includes first and second receiver windings 224A and 224B. The second receiver winding group includes first and second receiver windings 226A and 226B. The first and second receiver windings groups 224 and 226 are each formed by a plurality of loop segments 228 and 230 formed on two adjacent layers of the printed circuit board forming the read head 214.

The loop segments 228 and 230 are linked through feed-throughs 232 to form alternating positive polarity loops 234 and negative polarity loops 236 in each of the receiver windings 224A, 224B, 226A and 226B. The first receiver winding group 224 is positioned along a first edge of the read head 214 and inductively couples to the first loop portions 206 along the measuring axis. The second receiver winding group 226 is arranged along a second edge of the read head 214 and inductively couples to the second loop portions 208 along the measuring axis 212.

Each of the first loop portions 206 is arranged at a pitch equal to half of a wavelength $\lambda_1$ of the first receiver winding group 224. Furthermore, the first loop portions 206 each extends a distance along the measuring axis 212 matches the distance the second loop portions extend along the measuring axis. Each of the second loop portions 208 is arranged at a pitch equal to one-half of the wavelength $\lambda_2$ of the second receiver winding group 226. Furthermore, the second loop portions 208 each extends a distance along the measuring axis 212 which is as close as possible to the wavelength $\lambda_2$ while still providing an insulating space 240 between adjacent ones of the second loop portions 208. In addition, the first and second loop portions 206 and 208 extend a distance $d_1$ in a direction perpendicular to the measuring axis 212.

As shown in FIGS. 3 and 4, the second loop portions 208 are spaced a distance $d_2$ from the corresponding first loop portions 206 and the first and second receiver winding groups 224 and 226 are spaced the distance $d_2$ from each other. Accordingly, when the read head 214 is placed in proximity to the scale 202, as shown in FIG. 4, the first transmitter winding 216 and the first receiver winding group 224 inductively couple to the first loop portions 206 of the plurality of coupling loops 204. Similarly, the second transmitter winding 218 and the second receiver winding group 226 inductively couple to the second loop portions 208 of the plurality of coupling loops 204.

In operation, a time-varying drive signal is selectively output by the transmitter drive signal generator 220 to either the first transmitter winding 216 or the second transmitter winding 218. In the case of activating the first transmitter winding 216, each of the first loop portion 206 of the plurality of coupling loops 204 is inductively coupled to the first transmitter winding 216 by the magnetic field generated by the first transmitter winding 216. Thus, clockwise current flowing through the first transmitter winding 216 induces a counterclockwise current through the first loop portions 206.

The instantaneous counterclockwise flowing current in each of the first loop portions 206 of the coupling loops 204 generates a magnetic field that descends into the plane of FIG. 4 within every other one of the second loop portions 208 and that rises up out of the plane of FIG. 4 in the other of every other one of the second loop portions 208. Thus, a net alternating or spatially modulated magnetic field is formed along the measuring axis 212. This spatially modulated magnetic field of the second loop portions 208 of the coupling loops 204 has a wavelength $\lambda_2$.

Figure 1A:
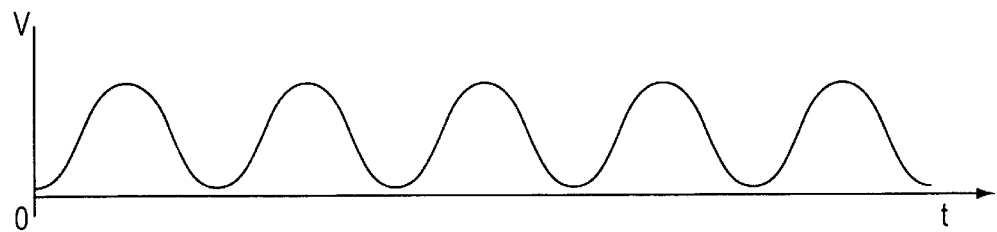
FIG. 1A shows the position-dependent output of positive polarity loops of an induced current position transducer.
Figure 1B:
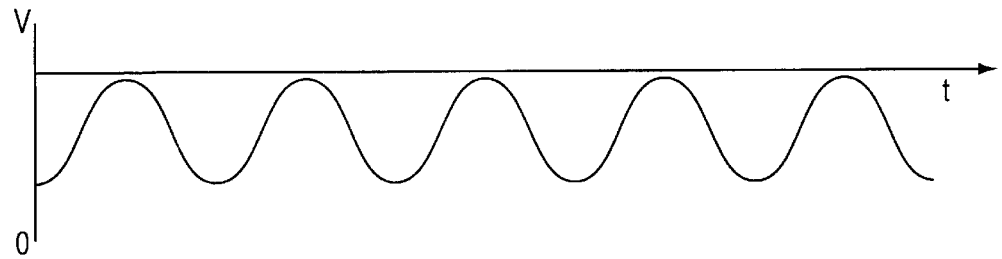
FIG. 1B shows the position-dependent output of negative polarity loops of an induced current position transducer.
Figure 1C:
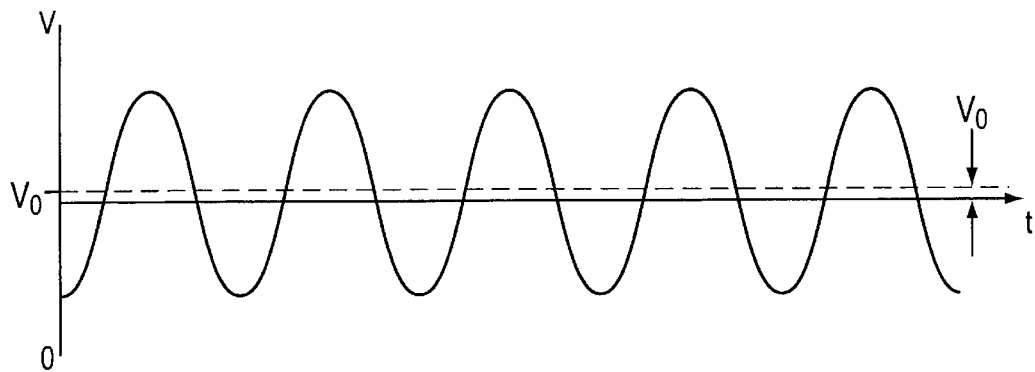
FIG. 1C shows the net position-dependent output of the positive and negative polarity loops of FIGS. 1A and 1B.

The net output of the positive polarity loops 234 of the second receiver winding group 226, as read head 214 moves relative to the scale 202 is a periodic function of the position "x" of the read head 214 along the scale 202. Similarly, the net output from the negative polarity loops 236 of the second receiver winding group 226, as the read head 214 moves relative to the scale 202, is also a periodic function of the position "x" of the read head 214 along the scale 202. The EMF contributions from the positive polarity loops 234 and the negative polarity loops 236 are in phase. Thus, combined positive polarity loops 234 and negative polarity loops 236 generate a net position-dependent output signal corresponding to FIG. 1C, but the DC bias $V_0$ due to extraneous coupling is reduced to insignificance in the reduced-offset absolute position transducer 200.

When a time-varying drive signal is applied to the first transmitter winding 216, a first magnetic field is generated within the first transmitter winding 216 that induces a current in the first loop portions 206 of the coupling loops 204. Thus, the first loop portions 206 of the coupling loops 204 are "inductively coupled" to the first transmitter winding 216. The current that is induced in the first loop portions 206 also flows through the second loop portions 208 of the coupling loops 204. Thus, the current in the second loop portions 208 is "coupled" to the current in the first loop portions 206. The current in the second loop portions 208 generates a magnetic field that is spatially modulated in the direction of the measuring axis 212. This spatially modulated magnetic field is sensed by the second receiver winding group 226. Thus, the second loop portions 208 are "inductively coupled" to the second receiver winding group 226.

There is also a direct inductive coupling between the first transmitter winding 216 and the second receiver winding group 226 due to the first magnetic field that is generated by the first transmitter winding 216 extending across the second receiver winding group 226 and inducing a secondary current within the second receiver winding group 226 directly. However, this direct inductive coupling is weaker than the inductive coupling between the second loop portions 208 and the second receiver winding group 226 because of the spatial offset between first transmitter winding 216 and the second receiver winding group 226. This is true because the strength of the magnetic field generated by the first transmitter winding 216 decreases substantially as the distance from the first transmitter winding 216 increases. Therefore, the DC bias $V_0$ due to direct coupling is substantially reduced by the spatial offset.

A similarly reduced DC bias $V_0$ is achieved when the time-varying drive signal is applied to the second transmitter winding 218 and the first receiver winding group 224 is used to sense the spatially modulated magnetic field produced by the first loop portions 206.

A receiver signal processor 242 inputs and samples the output signals from the second receiver winding group 226, converts these signals to digital values and outputs them to control unit 244. The control unit 244 processes these digitized output signals to determine the relative position x between the read head 214 and the scale 202 within a wavelength $\lambda_2$.

After the control unit 244 determines the relative position between the read head 214 and the scale 202 within a wavelength $\lambda_2$, the transmitter drive signal generator 220 then selects the second transmitter winding 218 to apply a time-varying drive signal to the second transmitter winding 218.

Each of the second loop portions 208 is inductively coupled to the second transmitter winding portion 218 by a magnetic field generated by the first transmitter winding 218. Thus, an instantaneous clockwise current flowing through the second transmitter winding 218 induces a counterclockwise induced current through each of the second loop portions 208. The instantaneous counterclockwise current in each of the second loop portions 208 generates a spatially modulated magnetic field that descends into the plane of FIG. 4 within every other one of the first loop portions 206 and that rises up out of the plane of FIG. 4 in the other of every other one of the first loop portions 206. Thus, a spatially modulated magnetic field is formed along the measuring axis 212. This spatially modulated magnetic field has a wavelength $\lambda_1$ of the first loop portions 206 of the coupling loops 204.

Accordingly, the net output of the positive polarity loops 234 of the first receiver winding group 224, as the read head 214 moves relative to the scale 202 is a periodic function of the position "x" of the read head 214 along the scale 202. Similarly, net the output from the negative polarity loops 236 of the first receiver winding group 224, as the read head 214 moves relative to the scale 202, is also a periodic function of the position "x" of the read head along the scale. The EMF contributions from the positive polarity loops 234 and the negative polarity loops 236 are in phase. Thus, the positive polarity loops 234 and the negative polarity loops 236 each generate a net position-dependent output signal corresponding to FIG. 1C, but the DC bias $V_0$ due to extraneous coupling is reduced to insignificance in this the reduced offset absolute position transducer 200.

The receiver signal processing circuit 242 then inputs and samples the output signals from the first receiver winding group 224, converts the signals to digital values and outputs them to control unit 244. The control unit 244 processes these digitized output signals to determine the relative position x between the read head 214 and the scale 202 within a wavelength $\lambda_1$.

The control unit 244 also outputs control signals to the transmitter drive signal generator 220 to generate the time-varying transmitter drive signals. It should be appreciated that any of the signal generating and processing circuits shown in the incorporated references can be used to implement the receiver signal processor 242, the transmitter drive signal generator 220 and the control unit 244. Thus, these circuits will not be described in further detail herein.

Either of the first or second transmitter windings 216 or 218 may have a time-varying drive signal applied by the transmitter drive signal while the corresponding, respective, second and first receiver winding groups 226 and 224 generate an output signal to provide a fine wavelength measurement.

The wavelengths $\lambda_1$ and $\lambda_2$ have values that are close to each other. Thus, the spatial phase difference between the signals derived from the two receivers 216 and 218 goes through a full 360° cycle over a spatial length much longer than either of the individual wavelengths $\lambda_1$ and $\lambda_2$. Accordingly, position output information from the first and second receiver winding groups 224 and 226 can be combined for long-range measurements. The processing for signals to obtain such long-range measurements is described in the incorporated 519 patent. Thus, a discussion of signal processing techniques will not be described herein.

Figure 5:
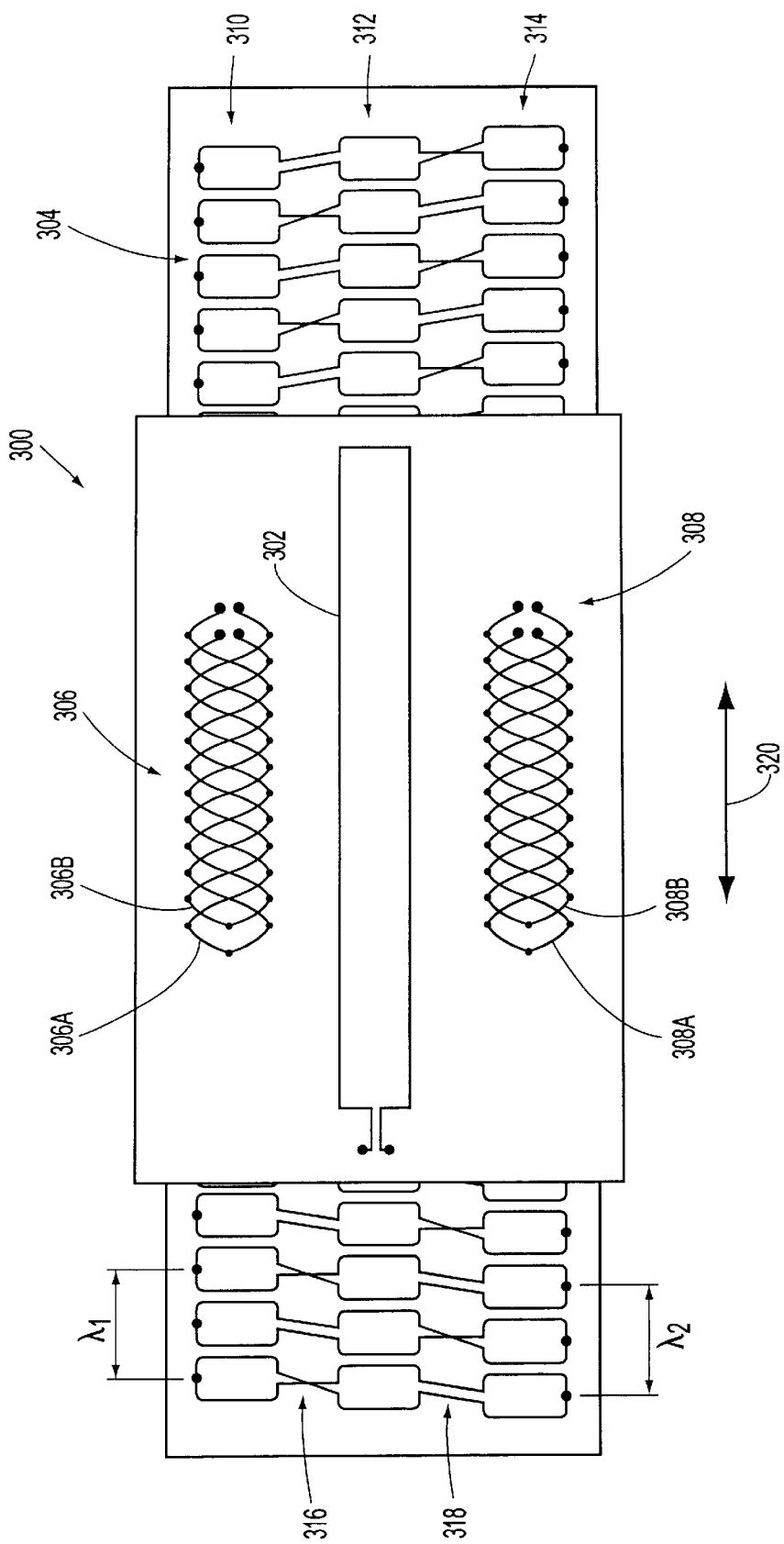
FIG. 5 shows a second embodiment of the reduced offset induced current absolute position transducer in accordance with this invention.

FIG. 5 shows a second exemplary embodiment of a reduced-offset induced current absolute position transducer 300. The absolute position transducer 300 includes a single transmitter winding 302, a plurality of coupling loops 304, a first receiver winding group 306 and a second receiver winding group 308. The plurality of coupling loops 304 each includes a first coupling loop portion 310, a second coupling loop portion 312 and a third coupling loop portion 314. The first coupling loop portions 310 are connected to the second coupling loop portions 312 by connecting conductors 316 and the second coupling loop portions 312 are connected to the third coupling loop portions 314 by connecting conductors 318. Every other one of the first connecting conductors 316 and the second connecting conductors 318 are twisted to spatially modulate the polarities of the first, second and third coupling loop portions 310, 312 and 314 along the measuring axis 320.

The receiver winding groups each have first and second receiver windings 306A, 306B, 308A, and 308B respectively. Coupling loop portions 310 are spaced along the measuring axis at one-half of a wavelength $\lambda_1$ while the third coupling loop portions 314 are spaced along the measuring axis at one-half of a wavelength $\lambda_2$.

The second exemplary embodiment of the absolute position transducer 300 has the ability to simultaneously sense the first receiver winding group 306, which has a position-dependent output signal that varies at the wavelength $\lambda_1$, and the second receiver winding group 308, which has a position-dependent output signal that varies at the wavelength $\lambda_2$. A time varying drive signal is applied to the transmitter winding 302 and the first receiver winding group 306 and the second receiver winding group 308 may be simultaneously sensed to determine the position of the read head along this scale.

Similar to the first exemplary embodiment, the second exemplary embodiment of the absolute position transducer 300 may use the position-dependent output on either of the first receiver winding group 306 or the second receiver winding group 308 to provide a fine wavelength measurement.

The wavelengths $\lambda_1$ and $\lambda_2$ are close to each other. Thus, the spatial phase difference between these wavelengths goes through a full 360° cycle over a spatial length that is much longer than either of the individual wavelengths $\lambda_1$ and $\lambda_2$. Accordingly, position output information from the first and second receiver winding groups 306 and 308 can be combined for long-range measurement.

Figure 6A:
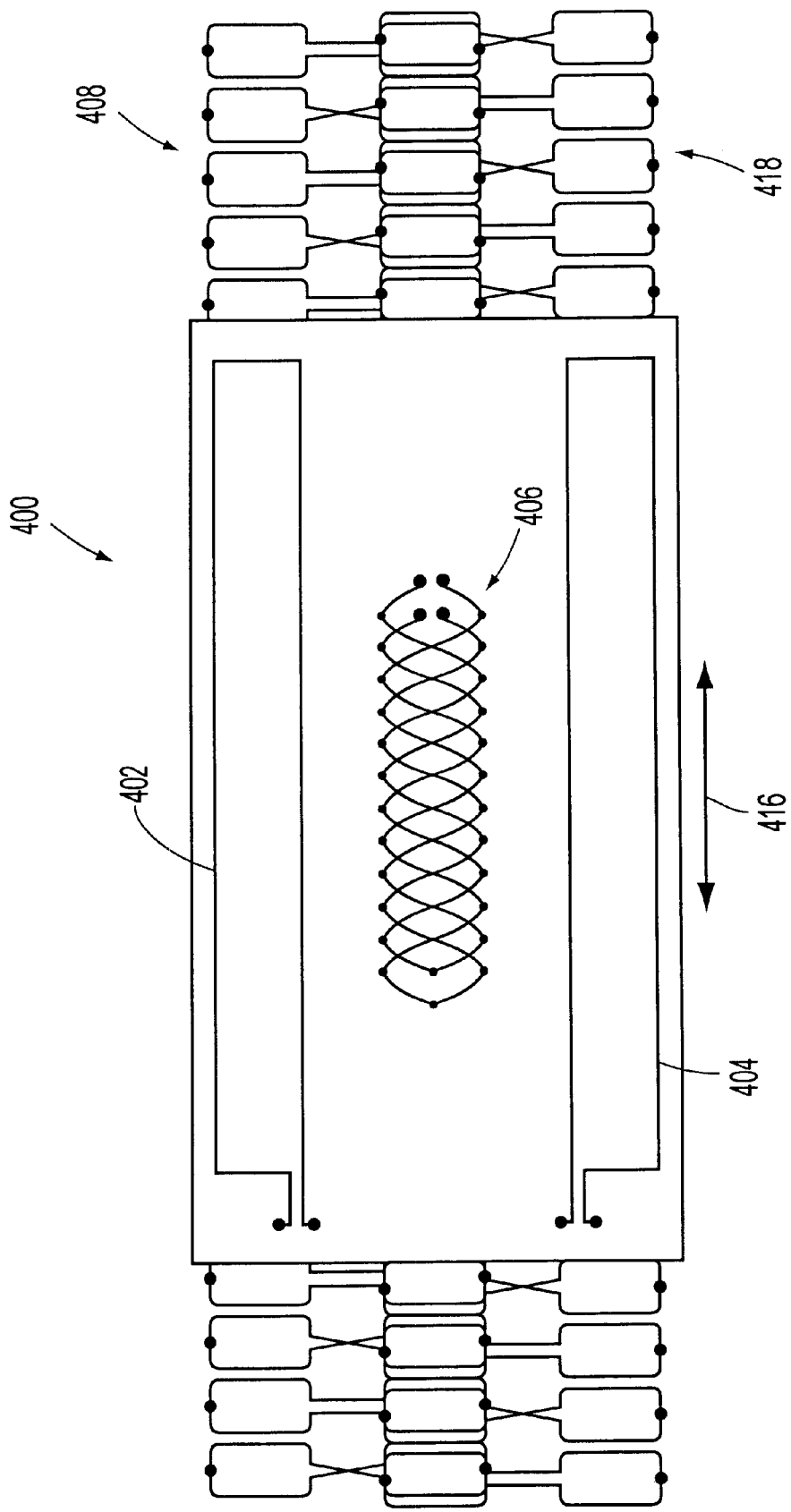
FIG. 6A shows a third embodiment of the reduced offset induced current absolute position transducer in accordance with this invention.
Figure 6B:
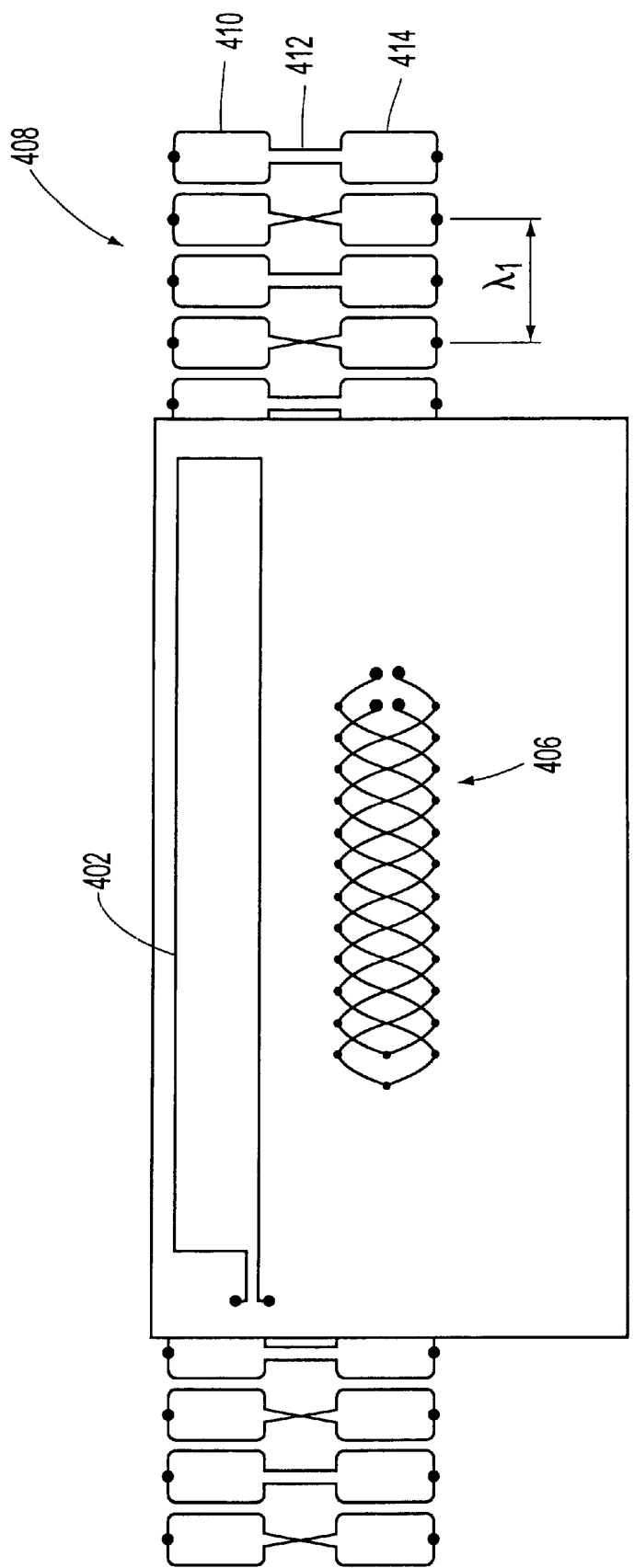
FIG. 6B shows a first transducer of the reduced offset induced current absolute position transducer of FIG. 6A.
Figure 6C:
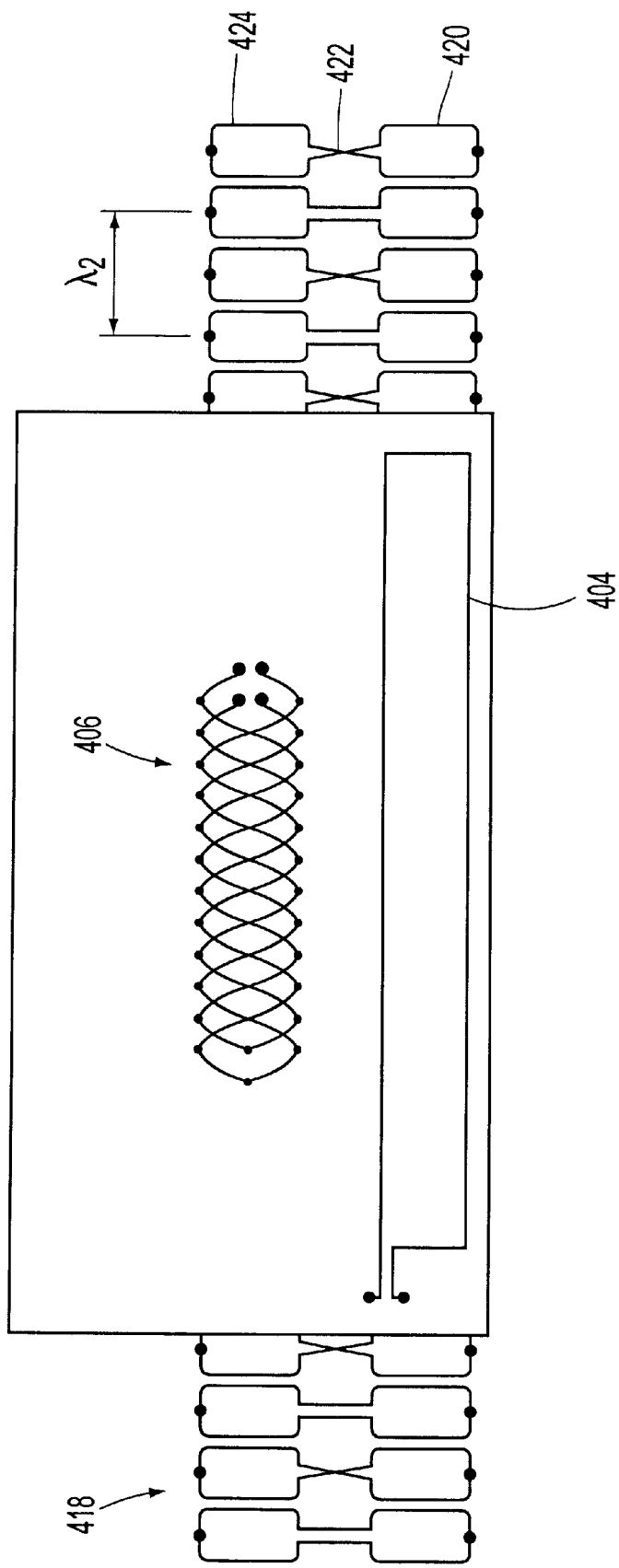
FIG. 6C shows a second transducer of the reduced offset induced current absolute position transducer of FIG. 6A.

FIGS. 6A–6C show a third exemplary embodiment of an absolute position transducer 400. The third exemplary embodiment of the absolute position transducer 400 is similar to the second exemplary embodiment of the absolute position transducer 300. However, the third exemplary embodiment of the absolute position transducer 400 includes a first transmitter winding 402 and a second transmitter winding 404 and only a single receiver winding group 406.

The third embodiment of the absolute position transducer 400 includes a first plurality of coupling loops 408 having first loop portions 410 connected by connecting conductors 412 to second loop portions 414. The second loop portions 414 are spaced along the measuring axis 416 at one-half of a wavelength $\lambda_1$. The absolute position transducer also has a second plurality of coupling loops 418 having first loop portions 420 connected by connecting conductors 422 to second loop portions 424. The second loop portions 424 are spaced along the measuring axis 416 at one-half of a wavelength $\lambda_2$.

FIG. 6B shows, for the purpose of clarity, only the first plurality of coupling loops 408, the receiver winding group 406 and the first transmitter winding 402. Similarly, FIG. 6C shows, for the purpose of clarity, only the second plurality of coupling loops 418, the receiver winding group 406 and the second transmitter winding 404.

In operation, a transmitter drive signal generator (not shown) selectively applies a time varying drive signal to either the first transmitter winding 402 or the second transmitter winding 404. If the transmitter drive signal generator applies a time varying drive signal to the first transmitter winding 402, then the receiving winding group 406 senses a position dependent output signal that varies at a wavelength $\lambda_1$. Similarly, if the transmitter drive signal generator applies a time varying drive signal to the second transmitter winding 404, then the receiver winding group 406 receives a position dependent output signal that varies with the wavelength $\lambda_2$.

The third embodiment of the absolute position transducer 400 reduces the complexity of the transducer because it only requires a single receiver winding group. However, the control unit must select which transmitter winding 402 or 404 to drive and cannot receive simultaneous position dependent output signals that vary about both wavelengths $\lambda_1$ and $\lambda_2$.

Figure 7:
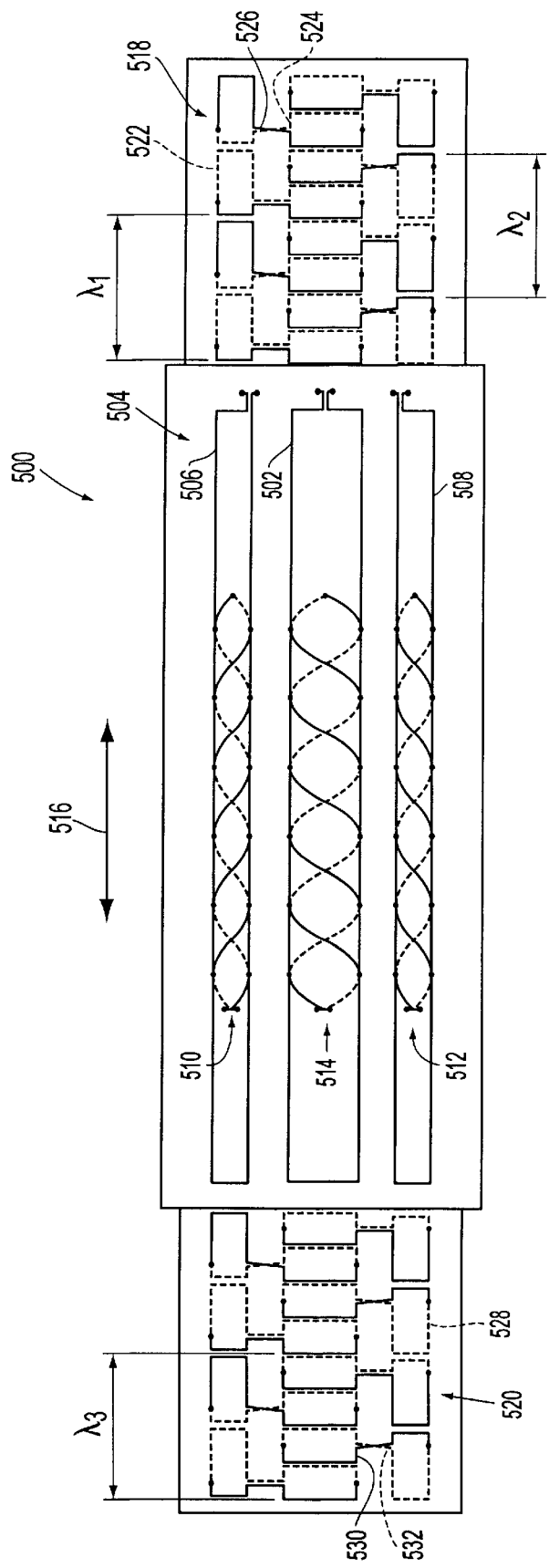
FIG. 7 shows a fourth embodiment of the reduced offset induced current absolute position transducer in accordance with this invention.

FIG. 7 shows a fourth exemplary embodiment of a reduced offset absolute position transducer 500 in accordance with the invention. The reduced offset absolute position transducer 500 includes a first transmitter winding 502 and a second transmitter winding 504. The second transmitter winding 504 includes a first transmitter winding portion 506 and a second transmitter winding portion 508. The reduced offset absolute position transducer 500 also includes a first receiver winding group 510, a second receiver winding group 512 and a third receiver winding group 514. For the sake of simplicity, FIG. 7 shows only a single winding of each of the receiver winding groups 510, 512, and 514. Each of the receiver winding groups 510, 512, and 514 consists of at least two receiver windings as shown in previous embodiments.

The reduced offset absolute position transducer 500 also includes a first plurality of coupling loops 518 and a second plurality of coupling loops 520. The first plurality of coupling loops 518 include first loop portions 522 and second loop portions 524 which are connected by connecting conductor 526. Every other set of the connecting conductors 526 is "twisted", so that a current flowing clockwise in a first loop portion 522 will flow counterclockwise in every other second loop portion 524. Thus, currents flow in opposite directions in every other second loop portion 524. The "twisting" can be provided by forming portions of the coupling loops 518 on separate layers of a printed circuit board, and by connecting the layers of the coupling loops 518 using feed-throughs as shown in FIG. 3 and FIG. 4.

Each of the second plurality of coupling loops 520 includes a first loop portions 528 and a second loop portion 530 connected by a connecting conductor 532. Every other set of the connecting conductors 532 is "twisted", so that a current flowing clockwise in a first loop portion 528 will flow counterclockwise in every other second loop portion 530. Thus, currents flow in opposite directions in every other second loop portion 530. The "twisting" can be provided by forming portions of the coupling loops 520 on separate layers of a printed circuit board, and by connecting the layers of the coupling loops 520 using feed-throughs as shown in FIG. 3 and FIG. 4.

The first loop portions 522 of the first plurality of coupling loops 518 are spaced along the measuring axis 516 at one-half of a wavelength $\lambda_1$. The first loop portions 528 of the second plurality of coupling loops 520 are spaced along the measuring axis 516 at one-half of a wavelength $\lambda_2$.

The second loop portions 524 of the first plurality of coupling loops 518 are interleaved along the measuring axis 516 with the second coupling loop portion 530 of the second plurality of coupling loops 520. The second coupling loop portion 524 of the first plurality of coupling loops 518 are spaced along the measuring axis 516 at one-half of a wavelength $\lambda_3$ and the second coupling loop portion 530 of the second plurality of coupling loops 520 are also spaced along the measuring axis 516 at one-half of a wavelength $\lambda_3$, resulting in a spacing along the measuring axis 516 of the combination of the second coupling loop portions 524 of the first plurality of coupling loops 518 and the second coupling loop portions 530 of the second plurality of coupling loops 520 of one-quarter of a wavelength $\lambda_3$.

In operation, a transmitter drive signal generator (not shown) selectively applies a time varying drive signal to either the first transmitter winding 502 or the second transmitter winding 504. When the transmitter drive signal generator applies a time varying drive signal to the first transmitter winding 502, the receiver signal processor (not shown) receives a position-dependent output signal from the first receiver winding group 510 that varies at the wavelength $\lambda_1$ and a position-dependent output signal from the second receiver winding 512 which varies at the wavelength $\lambda_2$.

The position dependent output signal from the first receiver winding 510 is dependent upon the spatially modulated magnetic field that is generated by the first plurality of coupling loops 518 and is spatially modulated at the wavelength $\lambda_1$ because of the twisting of every other set of connecting conductors 526. Similarly, the second receiver winding 512 outputs a position dependent output signal that varies with the spatially modulated magnetic field generated by the second plurality of coupling loops 520 and varies at the wavelength of $\lambda_2$ because of the twisting of every other set of connecting conductors 532. Therefore, when a time varying drive signal is applied to the transmitter winding 502 the receiver signal processor simultaneously receives position dependent output signals with wavelengths of $\lambda_1$ and $\lambda_2$.

As shown in FIG. 7, when the transmitter drive signal generator applies a time varying drive signal to the transmitter winding 504, the first transmitter winding portion 506 induces a time varying current in the first loop portion 522 of the first plurality of coupling loops 518, which generates a secondary magnetic field in the second loop portions 524 of the first plurality of coupling loops 518. At the same time, the second transmitter winding portion 508 induces a time varying current in the first loop portions 528 of the second plurality of coupling loops 520, which flows through the second loop portions 530 and which generates a secondary magnetic field within the second loop portions 530.

The current flowing in each of the transmitter windings 506 and 508 travel in opposite directions. Therefore, magnetic fields of opposite polarity are generated in the corresponding first loop portions 522 and 528, respectively. The secondary magnetic fields, generated in the second loop portions 524 and 530, are spatially modulated along the measuring axis 516 at a wavelength $\lambda_3$. This spatially modulated magnetic field is sensed by the third receiver winding group 514, which outputs a position-dependent output signal that varies with the position of the read head along the scale at a wavelength $\lambda_3$.

Similarly, when a transmitter drive signal generator applies a time-varying drive signal to the first transmitter winding 502, the first transmitter winding 502 induces a time-varying current in the second loops portions 524 and 530. The time-varying currents in the coupling loops 518 generates a first spatially modulated secondary magnetic field in the first loop portions 522. The first secondary magnetic field is spatially modulated at a wavelength $\lambda_1$ along the measuring axis. The time-varying current in the coupling loops 520 also generates a second spatially modulated secondary magnetic field in the first loop portions 528. The second secondary magnetic field is spatially modulated at a wavelength $\lambda_2$ along the measuring axis.

The fourth exemplary embodiment has an advantage over the first three embodiments because the fourth exemplary embodiment has the ability to sense position-dependent signals that vary at three different wavelengths. This three-wavelength system generally has an increased measuring range compared to a two-wavelength system. Signal processing for a three-wavelength system is described in the incorporated 519 patent. All subsequent embodiments described herein also sense a position-dependent output that varies at least by three different wavelengths. Signal processing for these embodiments will not be described herein because the incorporated references describe signal processing techniques.

This fourth reduced offset absolute position transducer 500 has position-dependent output signals with reduced offset and can sense three different position-dependent signals that vary along three different wavelengths. Any one of the wavelengths may provide a fine measurement, while any combination of wavelengths may provide a medium and/or coarse wavelength measurement that is much longer than any of the fine wavelength measurements.

Figure 8:
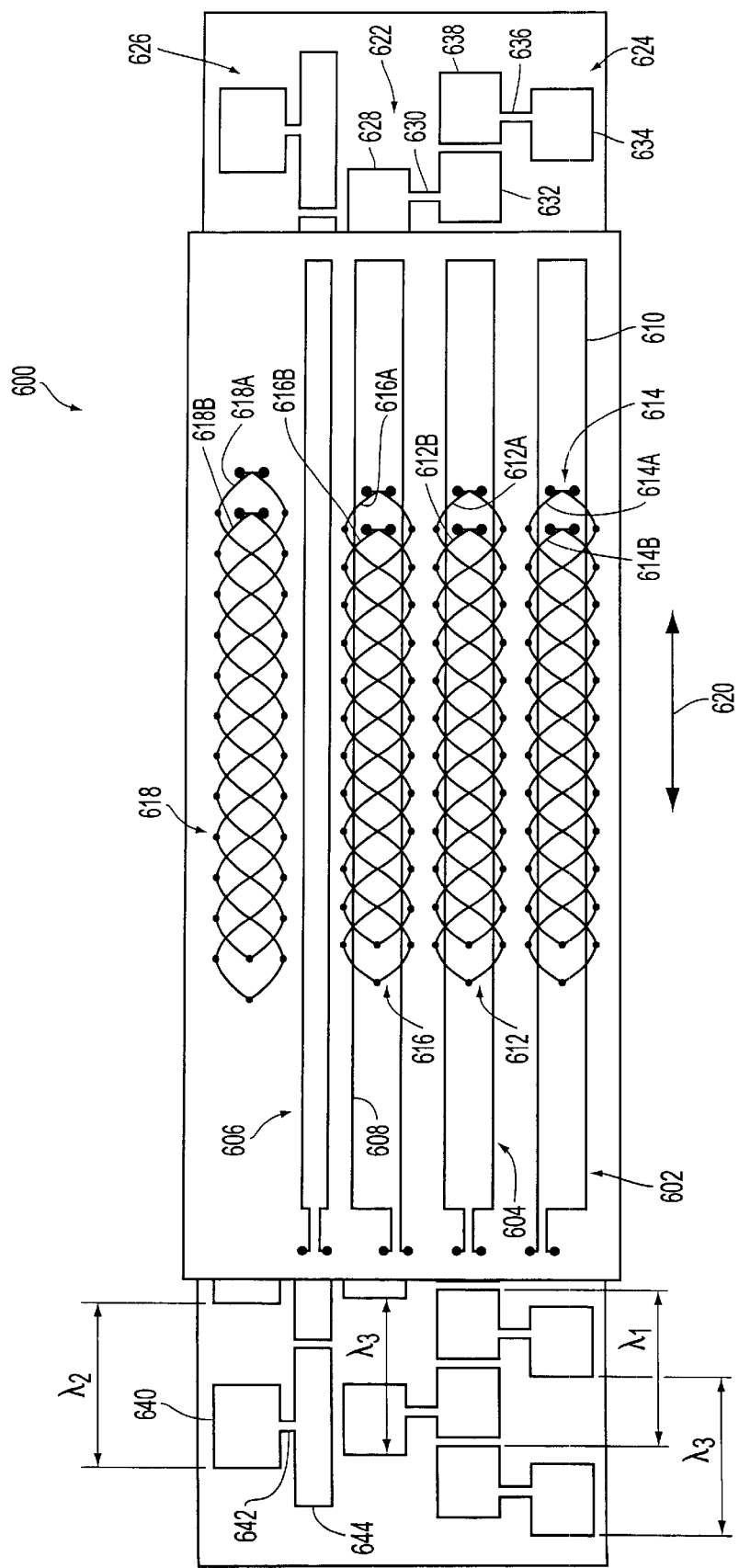
FIG. 8 shows a fifth embodiment of the reduced offset induced current absolute position transducer in accordance with this invention.

FIG. 8 shows a fifth exemplary embodiment of a reduced offset absolute position transducer 600. The reduced offset absolute position transducer 600 includes a first transmitter winding 602 and a second transmitter winding 604, and, optionally, can include a third transmitter winding 606. The first transmitter winding 602 includes a first portion 608 and a second portion 610. The first portion 608 and the second portion 610 can be connected in series or parallel, but preferably in a way that makes the current flow in opposite directions, clockwise and counterclockwise, in the two portions.

The reduced offset absolute position transducer 600 also includes a first receiver winding group 612, a second receiver winding group 614, and a third receiver winding group 616. If the reduced offset absolute position transducer 600 includes the optional third transmitter winding 606, it will also include a fourth receiver winding group 618. Each of the receiver winding groups 612, 614, 616 and 618 includes a first receiver winding 612A, 614A, 616A and 618A, respectively, and a second receiver winding 612B, 614B, 616B and 618B, respectively. The pairs of first and second receiving windings 612A and 612B, 614A and 614B, 616A and 61613, and 618A and 618B are each positioned along the measuring axis 620 at a spatial phase offset of 90°. This places the first and second receiver windings of each pair of receiver windings in quadrature.

It should be appreciated that, in place of the quadrature receiving windings 612A and 612B, 614A and 614B and 616A and 616B, and optionally 618A and 618B, described above, N-phase receiver windings could be used. Examples of N-phase receiver windings are shown in FIG. 14 of the incorporated 769 application and are discussed in detail, with respect to three-phase receiver windings, in U.S. patent application Ser. No. 08/834,432, incorporated herein by reference in its entirety. In N-phase receiver windings for this fifth exemplary embodiment of a reduced offset absolute position transducer 600, n receiver windings are included in each of the receiver winding groups 612, 614 and 616, and optionally 618. The n receiver windings in each receiver winding group 612, 614, 616 or 618 are spaced from each other by $\lambda/n$, where $\lambda$ is the spatial wavelength of the particular receiver group 612, 614, 616 or 618. It should further be appreciated that this is equivalent to saying the n receiver windings are spaced from each other by 360°/n. In general, n is usually 3. However, in such N-phase receiver winding groups, n can be any integer value greater than 2.

It should further be appreciated that any embodiment of the reduced offset absolute position transducer according to this invention, including the various exemplary embodiments discussed herein, can use N-phase receiver windings. It should also be appreciated that any space efficient combination of the transmitter and receiver winding structures and flux coupling loop structures disclosed herein and in the incorporated 432 application can be used. For example, the transducer of FIG. 4 disclosed herein can be used to provide two wavelengths of a three-wavelength transducer and could be combined with the transducer shown in FIG. 4 of the 432 application to provide a third, high-accuracy wavelength. This combination provides a long-range, high accuracy transducer. This combination also provides a three-wavelength alternative to the fifth exemplary embodiment of the reduced offset absolute position transducer 600 shown in FIG. 8 when it includes the optional third transmitter winding 606 and the fourth receiver winding group 618.

The reduced offset absolute position transducer 600 also includes a first plurality of coupling loops 622 and a second plurality of coupling loops 624. If the reduced offset absolute position transducer 600 includes the optional third transmitter winding 606, it will also include a third plurality of coupling loops 626. The first plurality of coupling loops 622 each includes a first loop portion 628 connected by connecting conductors 630 to a second loop portion 632. The second plurality of coupling loops 624 each includes a first loop portion 634 connected by connecting conductors 636 to a second loop portion 638. The third plurality of coupling loops 626 each includes a first loop portion 640 connected by connecting conductors 642 to a second loop portion 644.

The first loop portions 628 are spaced along the measuring axis 620 at a wavelength $\lambda_3$. The first loop portion 634 are also spaced along the measuring axis 620 at a wavelength $\lambda_3$. The second loop portions 632 are interleaved along the measuring axis 620 with the second loop portions 638. The second loop portions 632 are spaced along the measuring axis at a wavelength $\lambda_1$. The second loop portions 638 are also spaced along the measuring axis at a wavelength $\lambda_1$, interleaved with the second loop portions 632. If included in the reduced offset absolute position transducer 600, the first loop portions 640 will be spaced along the measuring axis 620 at a wavelength $\lambda_2$.

In operation, a transmitter drive signal generator (not shown) selectively applies a time-varying drive signal to either the first transmitter winding 602 or the second transmitter winding 604. If the third transmitter winding 606 is included in the reduced offset absolute position transducer 600, the transmitter drive signal generator may also apply a time varying drive signal to the third transmitter winding 606.

When the transmitting drive signal generator applies a time varying drive signal to the first transmitter winding 602, the first portion 608 induces a time varying current in the first loop portions 628 of the first plurality of coupling loops 622. This in turn generates a secondary magnetic field in the second loop portions 632 of the first plurality of coupling loops 622.

At the same time, the transmitting drive signal generator applies the same time varying drive signal to the second portion 610 of the transmitter 602 so that current flows in the second portion 610 in a direction opposite to, for, example, clockwise versus counterclockwise, the current flow in the first loop portion 608. This creates magnetic fields of opposite polarities in the first transmitter loop portion 608 and the second transmitter portion 610. The magnetic field generated by the second transmitter portion 610 induces a time varying current in the first loop portions 634 of the second plurality of coupling loops 624. This in turn generates a secondary magnetic field in the second loop portions 638 of the second plurality of coupling loops 624.

The polarity of the secondary magnetic fields generated by the second loop portions 632 and 638 are of opposite polarity. Therefore, a spatially modulated field is created along the array of second loop portions 632 and 638 of the pluralities of coupling loops 622 and 624 along the measuring axis at the wavelength $\lambda_1$. This spatially modulated field induces signals in the receiver windings 612A and 612B of the receiver 612. The amplitude of these signals is a periodic function of the position of the read head relative to the scale with the wavelength $\lambda_1$. The amplitude functions of the two windings 612A and 612B are phase-shifted along the measuring axis 620 by one quarter of the wavelength $\lambda_1$. The stray magnetic field through the receiver winding portions 612A and 612B from the transmitter portion 608 of the transmitter 602 is counteracted by the stray magnetic field from the transmitter portion 610 of the transmitter 602 because of the opposite directions of the currents in the two transmitter portions 608 and 610 of the transmitter 602.

When the transmitter drive signal generator applies a time-varying drive signal to the second transmitter winding 604, a time-varying current flows in the second transmitter winding 604, which generates a time-varying magnetic field. This time-varying field induces time-varying currents in the loop portions 632 and 638. These induced currents flow in opposite directions, clockwise versus counterclockwise, in the loop portions 632 and 638 relative to the time-varying current in the second transmitter winding 604.

These time-varying currents flow through the loop portions 632 and 638, the connecting conductors 630 and 636, and the second coupling loop portions 628 and 634 in the same direction as in the loop portions 632 and 638, and in a direction opposite to the direction of the time-varying current in the second transmitter winding 604. The time-varying currents in the second coupling loop portions 632 and 638 induce a magnetic field inside the area enclosed by the coupling loop portions 628 and 634 and a magnetic field of the opposite polarity outside the area enclosed by the coupling loop portions 628 and 634. Thus, since the coupling loop portions 628 and 634 are both spaced along the measuring axis 620 at wavelength $\lambda_3$, but extend only approximately $\lambda_3/2$ along the measuring axis 620, spatially modulated fields are created at a wavelength $\lambda_3$ on both tracks.

The coupling loop portions 634 are offset by one-half wavelength $\lambda_3$ along the measuring axis 620 from the coupling loop portions 628. In contrast, the receiver windings 616 are spaced at the same position along the measuring axis 620 as the receiver windings 614. Because of the placement along the measurement axis 620 of the coupling loop portions 628 and 634 relative to the receiver windings 614 and 616, the signal modulation due to position along the measurement axis 320 from the receiver winding 614 is of opposite polarity relative to the signal modulation due to position along the measurement axis 320 from the receiver winding 616.

The signals from the receiver windings 614 and 616 will have an offset caused by the stray field from the transmitter winding 604 and because the coupling loop portions 622 and 624 all carry current circulating in the same direction. The offsets in the signals from the receiver windings 614 and 616 are of the same polarity, while the signal modulations due to position along the measurement axis are of opposite polarity. By connecting the receiver windings in "anti-series", in series with the connections to one winding reversed relative to the other, the modulations with respect to position along the measuring axis 620 will add and the offsets will cancel.

In exemplary embodiments of the reduced offset absolute position transducer 600 that include the third transmitter winding 606, in response to the transmitter drive signal generator applying a time-varying drive signal causing a clockwise current to flow at an instant in time in the third transmitter winding 606, the third transmitter winding 606 generates a primary magnetic field. This primary magnetic field descends into the plane of FIG. 8 inside the loop formed by the third transmitter winding 606 and rises up out of the plane of FIG. 8 outside the loop formed by the third transmitter winding 606. In response, a counterclockwise current is induced in the second loop portions 644 that counteracts the change of magnetic field.

Thus, the induced current in each of the second loop portions 644 flows in a direction opposite to the current flowing in the respective adjacent third transmitter winding 606. The counterclockwise current induced in the second loop portions 644 also flows through the first loop portions 640. The counterclockwise current in each of the first loop portions 640 generates a secondary magnetic field that rises up out of the plane of FIG. 8 inside the first loop portions 640 and descends into the plane of FIG. 8 outside the first loop portions 640.

Therefore, because the first loop portions are spaced along the measuring axis 620 at a wavelength $\lambda_2$ and the first loop portions 640 individually extend only one-half of the wavelength $\lambda_2$ along the measuring axis 620, a spatially modulated field is created which is periodically distributed at the wavelength $\lambda_2$ along the measuring axis. This spatially modulated field does have an offset due to the stray magnetic field outside the third transmitter winding 606 and because the signals in the first coupling loop portions 640 are all of the same polarity. This offset is smaller than that of the prior art illustrated in FIG. 2, because the transmitter is located at a distance from the associated receiver winding. The offset is nominally eliminated by the balance of positive and negative loops in the receiver windings 618A and 618B.

In the various exemplary embodiments of the fifth reduced offset absolute position transducer 600, the symmetrical arrangement of the $\lambda_3$ windings around the $\lambda_1$ windings makes the combination of them for coarse measurement insensitive to yaw in the mounting of the read head relative to the scale.

The various exemplary embodiments of the fifth reduced offset absolute position transducer 600 are advantageous compared to the previously described exemplary embodiments with twisted connecting conductors between the coupling loop portions on the scale because it reduces the cost of manufacturing the scale because the coupling loops 622, 624 and 626 are in a single layer in a printed circuit board and feed throughs to connect between layers are not necessary.

In the various exemplary embodiments of the fifth reduced offset absolute position transducer 600 that include only the first transmitter winding 602 and the second transmitter winding 604, the two wavelengths in a typical exemplary embodiment of the fifth reduced offset position transducer 600 would be:

$\lambda_1$=5.4 mm, and $\lambda_3$=5.27 mm

The phase angle difference between the $\lambda_1$ and $\lambda_2$ tracks changes by 360° over a distance of $(\lambda_1 * \lambda_3)/(\lambda_1-\lambda_3)$=219 mm, which is the coarse wavelength $\lambda_C$. It is further advantageous to use the outer, $\lambda_1$ track, for the fine wavelength $\lambda_F$, because the $\lambda_1$ wavelength is evenly divisible by the measurement resolution of 10 $\mu$m.

The $\lambda_1$-track is used for taking fine resolution measurements. This track has the best quality signal because of the symmetrical arrangement of the transmitter loops 608 and 610 with their currents flowing in opposite directions on either side of the receiver 612, thereby balancing out any direct coupling from the transmitter windings 608 or 610 to the receiver windings 612. Also, if the transmitter windings 608 and 610 are connected in parallel, the signal strength is maximum for this track. The high quality, high amplitude signal is advantageous for a high interpolation factor, 1/512 for example, to achieve the fine resolution, such as, for example, 10 $\mu$m. It is further advantageous to use the outer, $\lambda$-track, for the fine wavelength $\lambda_F$, because the $\lambda_1$ wavelength is evenly divisible by the fine measurement resolution of 10 $\mu$m.

In the various exemplary embodiments of the fifth reduced offset absolute position transducer 600 that also include the third transmitter winding 606, the three wavelengths in a typical exemplary embodiment of the fifth reduced offset position transducer 600 would be:

$\lambda_1$=5.12 mm; $\lambda_2$=5.461 mm; $\lambda_3$=5.13 mm

The phase angle difference between the $\lambda_1$ and $\lambda_2$ tracks changes by 360° over a distance of $(\lambda_1 * \lambda_2)/(\lambda_2-\lambda_1)$=16*$\lambda_1$= 82 mm, which is the medium wavelength $\lambda_M$. It is advantageous to use the independent track implemented with the coupling loops 626 for the medium wavelength $\lambda_M$, because the medium wavelength will exhibit several 360° phase shifts relative to the other tracks over the total measuring range. Such multiple wavelength ratios cannot be implemented in interconnected channels without interruption of the array of coupling loops at regular intervals that cause measurement errors which limit the accuracy and maximum possible fine to medium wavelength ratio.

The phase difference between the $\lambda_1$ and $\lambda_3$ tracks gives 360° of phase shift over a distance of 32*$\lambda_M$=512*$\lambda_1 \cong$ $(\lambda_1 * \lambda_3)$ $(\lambda_3-\lambda_1)$=2627 mm, which is the coarse wavelength $\lambda_C$.

As indicated above, the $\lambda_1$-track is used for fine measurement. This track has the best quality signal because of the symmetrical arrangement of the transmitter loops 608 and 610 with their currents flowing in opposite directions on either side of the receiver 612, thereby balancing out any direct coupling from the transmitter windings 608 or 610 to the receiver windings 612. Also, if the transmitter windings 608 and 610 are connected in parallel, the signal strength is maximum for this track. The high quality, high amplitude signal is advantageous for a high interpolation factor, 1/512 for example, to achieve high resolution, 10 microns for this example.

The symmetrical arrangement of the $\lambda_3$ channels around the $\lambda_1$ channel makes the combination of them for coarse measurement insensitive to yaw in the mounting of the read head relative to the scale. The $\lambda_2$ track is sensitive to yaw, limiting the ratio of $\lambda_2/\lambda_1$ based on the yaw stability of the suspension system of the read head relative to the scale. This limitation could be eliminated by inserting another $\lambda_2$ track mirrored on the other side of the $\lambda_1$ and $\lambda_3$ tracks.

These various exemplary embodiments of the fifth reduced offset absolute position transducer 600 are advantageous compared to the previously described exemplary embodiments with twisted connecting conductors between the coupling loop portions on the scale because it reduces the cost of manufacturing the scale because the coupling loops 622 and 624, and the coupling loops 626 if included, are in a single layer in a printed circuit board and feed throughs to connect between layers are not necessary.

Figure 9:
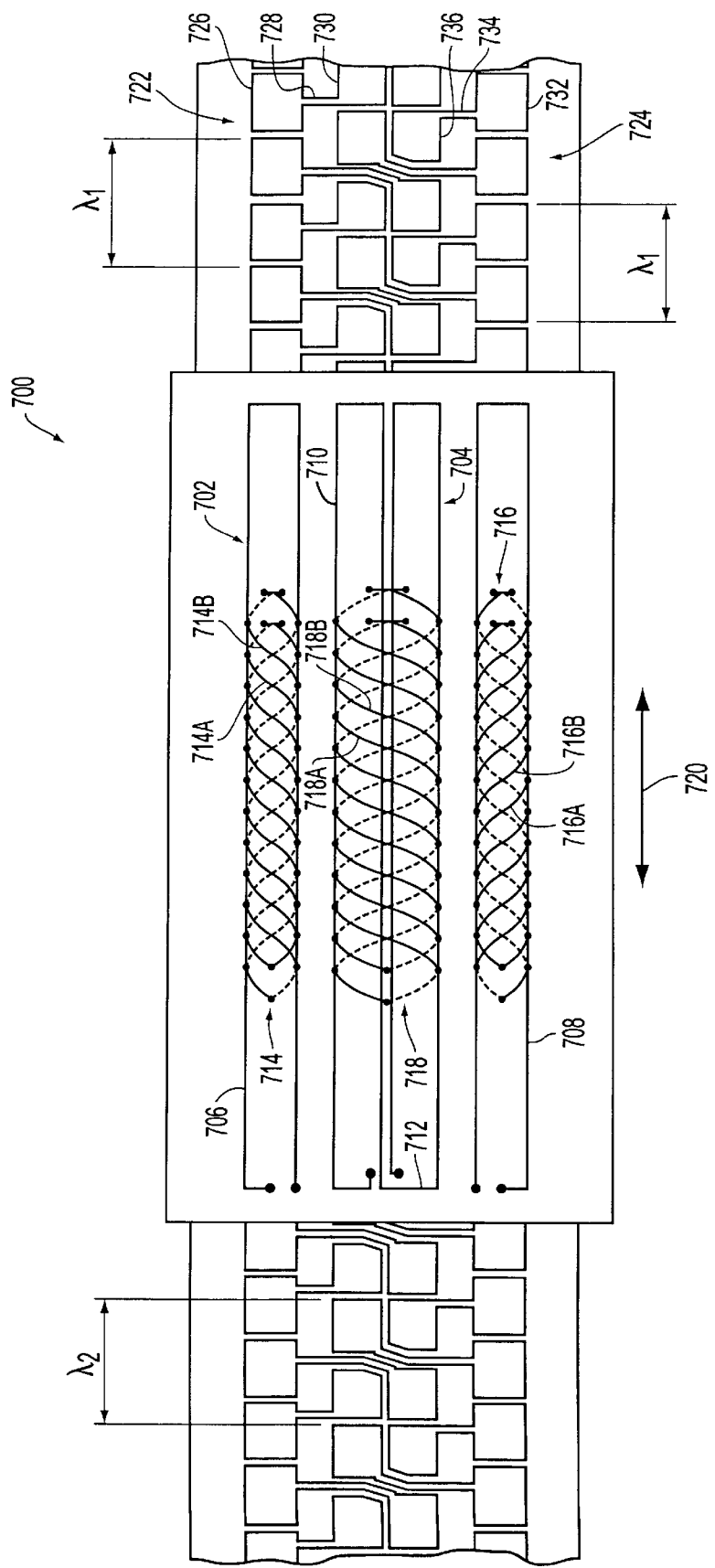
FIG. 9 shows a sixth embodiment of the reduced offset induced current absolute position transducer in accordance with this invention.

FIG. 9 shows a sixth exemplary embodiment of a reduced offset absolute position transducer 700. The reduced offset absolute position transducer 700 includes a first transmitter winding 702 and a second transmitter winding 704. The first transmitter winding 702 includes a first portion 706 and a second portion 708. The second transmitter winding 704 includes a first portion 710 and a second portion 712.

The reduced offset absolute position transducer 700 also includes a first receiver winding group 714, a second receiver winding group 716 and a third receiver winding group 718. Each of the receiver winding groups 714, 716 and 718 include a first receiver winding 714A, 716A and 718A, respectively, and a second receiver winding 714B, 716B and 718B, respectively. Each winding of the pairs of first and second receiver windings 714A and 714B, 716A and 716B, and 718A and 718B are each positioned along the measuring axis 720 at a spatial phase offset of 90° from the other winding of the pair. This places the first and second receiver windings of each pair of receiver windings in quadrature.

The reduced offset absolute position transducer 700 also includes a first plurality of coupling loops 722 and a second plurality of coupling loops 724. The first plurality of coupling loops 722 each includes a first loop portion 726 connected by a connecting conductor 728 to a second loop portion 730. Each of the second plurality of coupling loops 724 includes a first loop portion 732 connected by a connecting conductor 734 to a second loop portion 736. The first loop portions 726 of the first plurality of coupling loops 722 are spaced along the measuring axis 720 at a wavelength $\lambda_1$. The first loop portions 732 of the second plurality of coupling loops 724 are also spaced along the measuring axis 720 at a wavelength $\lambda_1$.

The second loop portions 730 of the first plurality of coupling loops 722 are interleaved along the measuring axis 720 with the second loop portions 736 of the second plurality of coupling loops 724. The second loop portions 730 and 736 also alternate between being aligned to inductively couple to the first portion 710 or the second portion 712 of the second transmitter winding 704. The second loop portions 730 and 736 are each positioned along the measuring axis at a wavelength 2.

In operation, a transmitter drive signal generator (not shown) selectively applies a time varying drive signal to either the first transmitter winding 702 or the second transmitter winding 704. When the transmitter drive signal generator applies a time-varying drive signal to the first transmitter winding 702, the receiver signal processor (not shown) receives a position-dependent output signal from the third receiver winding group 718 that varies at a wavelength $\lambda_2$. The position dependent output signal from the third receiver winding group 718 is dependent upon the spatially modulated magnetic field that is generated by the second loop portions 730 and 736 that is spatially modulated at a wavelength $\lambda_2$.

When the transmitter drive signal generator applies a time-varying drive signal to the second transmitter winding 704, the receiver signal processor receives a position-dependent output signal from the first receiver winding group 714 that varies at a wavelength $\lambda_1$ and a position-dependent output signal from the second receiver winding group 716 that also varies at a wavelength $\lambda_1$.

The fifth and sixth reduced offset absolute position transducer 600 and 700 of this invention have an advantage over the first four reduced offset absolute position transducers 200–500. The coupling loops in the fifth and sixth reduced offset absolute position transducer 600 and 700 are all on the same layer of a printed circuit board. Thus, feed-throughs are not necessary and the cost of manufacturing the scale member is significantly reduced. The sixth reduced offset position transducer 700 has an advantage over the fifth reduced offset position transducer 600 in that the secondary magnetic fields produced by first coupling loop portions 726 and 732 both are nominally pure alternating fields without any DC offset. A limitation of the absolute position transducer 700 is that the relatively complicated interconnect pattern on the scale limits its use to relatively long wavelengths.

It should be appreciated that although the foregoing exemplary embodiments of the reduced offset absolute position transducer of this invention are shown as linear transducers, that the designs are readily converted to rotary applications, as described in U.S. patent application Ser. No. 081441,769 which is incorporated herein in its entirety. Furthermore, although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is shown in and discussed in reference to FIG. 21 of the incorporated 769 application. Other applicable signal processing techniques will be apparent to those skilled in the art.

Thus, while this invention has been described in conjunction with the various exemplary embodiments outlined above, it is evident that many alternatives, modifications and variations will be apparent to those skilled in the art. Accordingly, the exemplary embodiments of the invention as set forth above are intended to be illustrative, not limiting. Various changes may be made without departing from the spirit and scope of the invention.

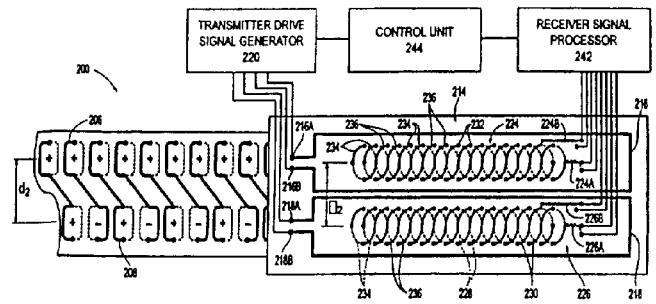

What is claimed is:

1. An absolute inductive position sensor, comprising:

a first member;

a second member having a measuring axis, the first member and the second member relatively positionable along the measuring axis;

at least two magnetic field generators, each magnetic field generator comprising at least one flux generator winding portion, each magnetic field generator activatable to generate a changing magnetic flux in a corresponding primary flux region in response to a drive signal;

at least one plurality of flux coupling loops distributed along the measuring axis, at least one receptor portion of each flux coupling loop positionable within at least one of the primary flux regions and at least one secondary flux generator portion of each flux coupling loop positionable outside of the at least one primary flux regions within which the at least one receptor portion of that flux coupling loop is positionable, wherein, when at least one primary flux region is activated, an induced current is generated in the at least one receptor portion positionable in that at least one activated primary flux region in response to the changing magnetic flux in that at least one activated primary flux region, and the induced current in the corresponding at least one receptor portion activates at least one corresponding secondary flux generator portion to produce a secondary changing magnetic flux in the at least one activated secondary flux generator portion, a plurality of activated secondary flux generator portions producing a spatially modulated magnetic flux in at least one activated secondary flux region that is physically separated from the at least one activated primary flux region, each spatially modulated magnetic flux modulated along the measuring axis according to a predetermined function; and at least two sets of magnetic flux sensors, each set of magnetic flux sensors positioned to sense the changing magnetic flux in a corresponding activatable secondary flux region;

wherein:

each flux coupling loop has at least first and second portions spaced apart from each other across the measuring axis;

the at least two magnetic field generators and the at least two sets of magnetic flux sensors are located on one of the first and second members, and the at least one plurality of flux coupling loops is located on the other of the first and second members; and each set of magnetic flux sensors generates at least one output signal based on the sensed magnetic flux, each output signal being a function of at least one of the relative position along the measuring axis between the first and second members and the pattern of the spatially modulated flux present in the activated secondary flux region associated with that set of magnetic flux sensors; and at any relative position between the first and second members, the absolute inductive position sensor can generate at least a first output signal from at least a first set of magnetic flux sensors by activating a first one of the at least two magnetic field generators, at least the first portions of at least a sub-plurality of the at least one plurality of flux coupling loops acting as the corresponding receptor portions, at least the second portions of the sub-plurality of the at least one plurality of flux coupling loops acting as the corresponding activated secondary flux generator portions, and the absolute inductive position sensor can generate at least a second output signal from at least a second set of magnetic flux sensors by activating a second one of the at least two magnetic field generators, at least the second portions of the sub-plurality of the at least one plurality of flux coupling loops acting as the corresponding receptor portions, at least the first portions of the sub-plurality of the at least one plurality of flux coupling loops acting as the corresponding activated secondary flux generator portions; and a relationship between at least the first and second output signals is unique for each relative position along the measuring axis between the first and second members.

2. The absolute inductive position sensor of claim 1, wherein the at least two sets of magnetic flux sensors comprise two sets of magnetic flux sensors, each magnetic flux sensor comprising a receiver winding, and each receiver winding of at least one of the first set of magnetic flux sensors comprising corresponding first and second receiver winding portions.

3. The absolute inductive position sensor of claim 2, wherein corresponding first and second receiver winding portions of the first set of magnetic flux sensors are symmetrically disposed on opposite sides of the second set of magnetic flux sensors in a direction across the measuring axis.

4. The absolute inductive position sensor of claim 3, wherein:

the first portions of the at least one plurality of flux coupling loops are spaced along the measuring axis at an interval related to a first wavelength; and the second portions of the at least one plurality of flux coupling loops alternately extending, symmetrically from opposite sides of the first portions, across the measuring axis to form two tracks of second portions, the second portions in each track spaced along the measuring axis at an interval related to a second wavelength.

5. The absolute inductive position sensor of claim 3, wherein:

the at least one plurality of flux coupling loops comprises a first plurality of flux coupling loops interleaved with a second plurality of flux coupling loops;

the first portions of the first and second pluralities of flux coupling loops are aligned along the measuring axis and are spaced along the measuring axis at an interval related to a first wavelength;

each of the second portions of the first plurality of flux coupling loops extending from a first side of a corresponding first portion of the first plurality of flux coupling loops across the measuring axis to form a first track of second portions;

each of the second portions of the second plurality of flux coupling loops extending from a second side of a corresponding first portion of the second plurality of flux coupling loops across the measuring axis to form a second track of second portions, the second side opposite the first side; and the second portions in each of the first and second tracks spaced along the measuring axis at an interval related to a second wavelength.

6. The absolute inductive position sensor of claim 3, wherein each pair of corresponding first and second receiver winding portions is connected in series.

7. The absolute inductive position sensor of claim 3, further comprising a signal processing circuit, wherein:

each pair of corresponding first and second receiver winding portions generates a pair of corresponding first and second portion signals connectable to the signal processing circuit; and the signal processing circuit processes the pair of corresponding first and second portion signals to form a composite signal.

8. The absolute inductive position sensor of claim 1, wherein a first one of the at least two flux generators is activated during a first time period and a second one of the at least two flux generators is activated during a second time period occurring after the first time period.

9. The absolute inductive position sensor of claim 8, wherein:

the second time period occurs within a third time period of the first time period; and the first, second and third time periods each have a corresponding duration that is sufficiently short such that relative motion between the first and second members has a negligible effect on the relationship between the at least first and second output signals.

10. The absolute inductive position sensor of claim 1, wherein a first one of the at least two flux generators comprises a first winding portion and a second winding portion that are activated simultaneously when the first flux generator is activated.

11. The absolute inductive position sensor of claim 10, wherein the first winding portion and the second winding portion are connected in series.

12. The inductive absolute position sensor of claim 1, wherein each predetermined function is a periodic function and each of the at least two sets of magnetic flux sensors comprises a first receiver winding and a second receiver winding arranged in quadrature.

13. The inductive absolute position sensor of claim 1, wherein each predetermined function is a periodic sinusoidal function of predetermined spatial wavelength and each of the at least two sets of magnetic flux sensors comprises a first receiver winding, a second receiver winding, and a third receiver winding, each winding in a set placed along the measuring axis corresponding to a spatial phase separation of 60 degrees or 120 degrees in relation to the spatial wavelength of the spatially modulated flux received by that set of windings.

14. The inductive absolute position sensor of claim 13, wherein, each of the receiver windings in a set are spatially modulated at the same wavelength as the spatially modulated flux received by that set of windings.

15. The inductive absolute position sensor of claim 1, wherein each predetermined function is a periodic function of predetermined spatial wavelength and each of the at least two sets of magnetic flux sensors comprises N receiver windings, N greater than or equal to 4, and each winding in a set is placed along the measuring axis corresponding to spatial phase separation of 360°/N in relation to the spatial wavelength of the spatially modulated flux received by that set of windings.

16. An inductive absolute position sensor, comprising:
   a first member;
   at least two magnetic field generators positioned on the first member, each magnetic field generator comprising at least a first winding;
   a second member having a measuring axis, the first member positioned adjacent to the second member, the first member and second member movable relative to each other along the measuring axis, the second member comprising a set of regions, each region corresponding to a magnetic field generator winding and the regions extending along the measuring axis and spaced apart across the measuring axis, wherein:
      the magnetic field generators are positioned on the first member such that, when the first member is positioned adjacent to the second member, each magnetic field generator winding is adjacent the corresponding region of the second member, and
      each of the magnetic field generator windings is responsive to a drive signal to generate a changing magnetic flux in the corresponding region of the second member; and
   at least a first plurality of flux coupling loops positioned on the second member, each flux coupling loop having at least a first coupling loop portion and a second coupling loop portion, wherein:
      the first coupling loop portions of at least the first plurality of flux coupling loops are positioned in a first region of the second member corresponding to a first magnetic field generator winding and are spaced along the measuring axis at an interval related to a first wavelength,
      the second coupling loop portions of at least the first plurality of flux coupling loops are spaced along the measuring axis at an interval related to a second wavelength, and are positioned in at least one region of the second member which is spaced apart from the first region across the measuring axis, and
   at least two sets of magnetic field sensors positioned on the first member, wherein:
      the at least two sets of magnetic field sensors are positioned on the first member such that, when the first member is positioned adjacent to the second member, the at least two sets of magnetic field sensors are adjacent corresponding regions of the second member, respectively, and
      each of the at least two sets of magnetic field sensors is responsive to a changing magnetic flux in the corresponding region of the second member, respectively, to generate a sensed signal;
   wherein:
      a plurality of first coupling loop portions are responsive to the changing magnetic flux in the first region to generate induced currents, the induced currents flowing through the connected plurality of second coupling loop portions to generate a changing magnetic flux in the at least one region of the second member which is spaced apart from the first region across the measuring axis to generate an output signal in at least the second set of the at least two sets of magnetic field sensors that is a function of the relative position along the measuring axis between the second set of magnetic field sensors and the plurality of second coupling loop portions, the output signal of the second set of magnetic field sensors varying at the second wavelength, and
   a plurality of second coupling loop portions are responsive to the changing magnetic flux in the at least one region of the second member which is spaced apart from the first region across the measuring axis to generate induced currents currents, the induced currents flowing through the connected plurality of first coupling loop portions to generate changing magnetic flux in the first region to generate output signals in the first set of the at least two sets of magnetic field sensors that is a function of the relative position between the first set of magnetic field sensors and the plurality of first coupling loop portions, the output signal of the first set of magnetic field sensors varying at the first wavelength.

17. The inductive absolute position sensor of claim 16, wherein at least the second of the at least two magnetic field generators comprises two winding portions in two different regions of the second member which are spaced apart from the first region across the measuring axis, and the winding portions are electrically connected in series or anti-series.

18. The inductive absolute position sensor of claim 16, wherein the at least two sets of magnetic field sensors comprise three sets, the at least one region of the second member which is spaced apart from the first region across the measuring axis comprises second and third regions corresponding to the second and third sets of magnetic field sensors.

19. The inductive absolute position sensor of claim 18, wherein:
   the second member further comprises a fourth region and a fifth region, the fourth and fifth regions extending along the measuring axis and spaced apart from each other;
   the at least two magnetic field generators comprises an additional magnetic field generator positioned on the first member, wherein:
      the additional magnetic field generator is positioned such that, when the first member is positioned adjacent to the second member, the additional magnetic field generator is adjacent the fourth region of the second member, respectively, and
      the additional magnetic field generator is responsive to a drive signal to generate a changing magnetic flux in the fourth region of the second member;
   the three sets of magnetic field sensors comprises an additional set of magnetic field sensors positioned on the first member, wherein:
      the additional set of magnetic field sensors is positioned such that, when the first member is positioned adjacent to the second member, the additional set of magnetic field sensors is adjacent the fifth region of the second member, respectively, and
      the additional set of magnetic field sensors is responsive to a changing magnetic flux in the fifth region of the second member to generate a sensed signal; and the at least a first plurality of flux coupling loops includes an additional plurality of flux coupling loops, wherein
the plurality of first coupling loop portions of the additional set of flux coupling loops are positioned in the fourth region of the second member and are spaced along the measuring axis, and
the plurality of second coupling loop portions of the additional set of flux coupling loops are positioned in the fifth region of the second member and are spaced along the measuring axis at an interval related to an additional wavelength; and
the plurality of first coupling loop portions of the additional set of flux coupling loops are responsive to the changing magnetic flux in the fourth region to generate induced currents, the induced currents flowing through the plurality of second coupling loop portions of the additional set of flux coupling loops to generating a changing magnetic flux in the fifth region to generate an output signal in the additional set of magnetic field sensors that is a function of the relative position between the additional set of magnetic field sensors and the plurality of second coupling loop portions of the additional set of flux coupling loops, the output signal of the additional set of magnetic field sensors varying at the additional wavelength.

20. The inductive absolute position sensor of claim 19, wherein the receiver windings of the additional set of magnetic field sensors are spatially modulated at the additional wavelength.

21. The inductive absolute position sensor of claim 18, wherein sensors from the second and third sets of magnetic field sensors that contribute signals corresponding to the same spatial phase are electrically connected together.

22. The inductive absolute position sensor of claim 18, wherein sensors from the second and third sets of magnetic field sensors that contribute signals corresponding to the same spatial phase are electronically combined during signal processing.

23. The inductive absolute position sensor of claim 16, wherein each of the sets of magnetic field sensors comprises a first receiver winding and a second receiver winding arranged in quadrature.

24. The inductive absolute position sensor of claim 16, wherein each of the sets of magnetic field sensors comprises n receiver windings arranged at a spacing of $\lambda/n$ or $\lambda/2n$, where $\lambda$ is the wavelength corresponding to the coupling loop portions in the adjacent corresponding region.

25. The inductive absolute position sensor of claim 24, wherein, in each of the sets of magnetic field sensors, the n receiver windings are spatially modulated at the wavelength corresponding to the coupling loop portions in the adjacent corresponding region.

26. A method for determining an absolute position of a first member relative to a second member along a measuring axis, comprising:
driving a first magnetic field generator with a changing current to generate a first changing magnetic flux in a first region of the second member;
inductively generating a current in a first coupling loop portion of each of a plurality of flux coupling loops in response to the first changing magnetic flux, the plurality of flux coupling loops divided into a first set and a second set, the first coupling loop portions arranged in the first region and along the measuring axis at an interval corresponding to a first wavelength;
conducting the current in the first coupling loop portion of each flux coupling loop to a second coupling loop portion of that flux coupling loop, the second coupling loop portions of the plurality of flux coupling loops extending from the first coupling loop portions across the measuring axis, the second coupling loop portions of each of the first and second sets positioned in second and third regions of the second member, respectively, and arranged along the measuring axis at an interval corresponding to a second wavelength;
driving the second coupling loop portions with the current to generate a second changing magnetic flux in each of the second and third regions;
inductively generating a signal in each of a first set of magnetic flux sensors and a second set of magnetic flux sensors in response to the second changing magnetic flux, the first and second sets of magnetic flux sensors positioned adjacent the second and third regions and extending along the measuring axis, the first and second sets of magnetic flux sensors arranged at an interval corresponding to the second wavelength;
sensing the signals generated in each of the first and second sets of magnetic flux sensors;
driving a second magnetic field generator with a changing current, the second magnetic field generator having first and second portions positioned adjacent the second and third regions of the second member, to generate a third changing magnetic flux in the second and third regions of the second member;
inductively generating a current in the second coupling loop portions of each of a plurality of flux coupling loops in response to the third changing magnetic flux;
conducting the current in the second coupling loop portion of each of the plurality of flux coupling loops to the first coupling loop portion of that flux coupling loop;
driving the first coupling loop portions with the current to generate a fourth changing magnetic flux in the first region;
inductively generating a signal in a third set of magnetic flux sensors in response to the fourth changing magnetic flux, the third set of magnetic flux sensors positioned adjacent the first region and extending along the measuring axis, the third set of magnetic flux sensors arranged at an interval corresponding to the first wavelength;
sensing the signals generated in each of the third set of magnetic flux sensors; and
determining the absolute position of the first member relative to the second member along a measuring axis based on the signals generated in each of the first, second and third sets of magnetic flux sensors.

27. The method of claim 26, wherein driving the second magnetic field generator with a changing current comprises driving the first portion of the second magnetic field generator with the current flowing in a first direction, and driving the second portion of the second magnetic field generator with the current flowing in second direction that is opposite the first direction.

28. A method for determining an absolute position of a first member relative to a second member along a measuring axis, comprising:
driving a first magnetic field generator with a changing current to generate a first changing magnetic flux in a first region of the second member;
inductively generating a current in a first coupling loop portion of each of a plurality of flux coupling loops in response to the first changing magnetic flux, the plurality of flux coupling loops divided into a first set and a second set, the first coupling loop portions arranged in the first region and along the measuring axis at an interval corresponding to a first wavelength;

conducting the current in the first coupling loop portion of each flux coupling loop to a second coupling loop portion of that flux coupling loop, the second coupling loop portions of the plurality of flux coupling loops extending from the first coupling loop portions across the measuring axis, the second coupling loop portions of each of the first and second sets positioned in second and third regions of the second member, respectively, and arranged along the measuring axis at an interval corresponding to a second wavelength;

driving the second coupling loop portions with the current to generate a second changing magnetic flux in each of the second and third regions;

inductively generating a signal in each of a first set of magnetic flux sensors and a second set of magnetic flux sensors in response to the second changing magnetic flux, the first and second sets of magnetic flux sensors positioned adjacent the second and third regions and extending along the measuring axis, the first and second sets of magnetic flux sensors arranged at an interval corresponding to the second wavelength;

sensing the signals generated in each of the first and second sets of magnetic flux sensors;

driving a second magnetic field generator and a third magnetic field generator with a changing current to generate a third changing magnetic flux in the second and third regions of the second member;

inductively generating a current in the second coupling loop portions of each of a plurality of flux coupling loops in response to the third changing magnetic flux;

conducting the current in the second coupling loop portion of each of the plurality of flux coupling loops to the first coupling loop portion of that flux coupling loop;

driving the first coupling loop portions with the current to generate a fourth changing magnetic flux in the first region;

inductively generating a signal in a third set of magnetic flux sensors in response to the fourth changing magnetic flux, the third set of magnetic flux sensors positioned adjacent the first region and extending along the measuring axis, the third set of magnetic flux sensors arranged at an interval corresponding to the first wavelength;

sensing the signals generated in each of the third set of magnetic flux sensors; and determining the absolute position of the first member relative to the second member along a measuring axis based on the signals generated in each of the first, second and third sets of magnetic flux sensors.

29. The method of claim 28, wherein driving the second and third magnetic field generators with a changing current comprises driving the second magnetic field generator with the current flowing in a first direction, and driving the third magnetic field generator with the current flowing in second direction that is opposite the first direction.

30. An inductive absolute position sensor, comprising:

a first member;

a second member, the first member movable relative to the second member along a measuring axis;

a first magnetic field generator, wherein, when the first magnetic field generator is driven with a changing current, the first magnetic field generator generates a first changing magnetic flux in a first region of the second member;

first and second sets of magnetic flux sensors, the first and second sets of magnetic flux sensors positioned adjacent second and third regions of the second member and extending along the measuring axis, the second and third regions physically separate from the first region, the first and second sets of magnetic flux sensors arranged at an interval corresponding to a first wavelength a plurality of flux coupling loops, the plurality of flux coupling loops divided into a first set and a second set, each flux coupling loop having a first coupling loop portion, the first coupling loop portions arranged in the first region and along the measuring axis at an interval corresponding to a second wavelength, and a second coupling loop portion, the second coupling loop portions of the plurality of flux coupling loops extending from the first coupling loop portions across the measuring axis, the second coupling loop portions of each of the first and second sets positioned in second and third regions of the second member, respectively, and arranged along the measuring axis at an interval corresponding to the first wavelength, wherein, in response to the first changing magnetic flux:

a current is inductively generated in the first coupling loop portion of each of the plurality of flux coupling loops, the current in the first coupling loop portion of each flux coupling loop is conducted to the second coupling loop portion of that flux coupling loop, the second coupling loop portions driven with the current to generate a second changing magnetic flux in each of the second and third regions, the second changing magnetic flux spatially modulated along the measuring axis at an interval corresponding to the first wavelength, and in response to the second changing magnetic flux, a signal is inductively generating in each of the first set of magnetic flux sensors and the second set of magnetic flux sensors;

a second magnetic field generator having first and second portions, wherein, when the second magnetic field generator is driven with a changing current, the first and second portions generates a third changing magnetic flux in the second and third regions of the second member, respectively;

a third set of magnetic flux sensors, the third set of magnetic flux sensors positioned adjacent the first region and extending along the measuring axis, the third set of magnetic flux sensors arranged at an interval corresponding to the second wavelength, wherein, in response to the third changing magnetic flux:

a current is inductively generated in the second coupling loop portion of each of the plurality of flux coupling loops, the current in the second coupling loop portion of each flux coupling loop is conducted to the first coupling loop portion of that flux coupling loop, the first coupling loop portions driven with the current to generate a fourth changing magnetic flux in the first region, the fourth changing magnetic flux spatially modulated along the measuring axis at an interval corresponding to the second wavelength, and in response to the fourth changing magnetic flux, a signal is inductively generating in the third set of magnetic flux sensors; and a signal processing circuit that determines an absolute position of the first member relative to the second member along the measuring axis based on the signals generated in each of the first, second and third sets of magnetic flux sensors.

31. An inductive absolute position sensor, comprising:

a first member;

a second member, the first member movable relative to the second member along a measuring axis;

a first magnetic field generator, wherein, when the first magnetic field generator is driven with a changing current, the first magnetic field generator generates a first changing magnetic flux in a first region of the second member;

first and second sets of magnetic flux sensors, the first and second sets of magnetic flux sensors positioned adjacent second and third regions of the second member and extending along the measuring axis, the second and third regions physically separate from the first region, the first and second sets of magnetic flux sensors arranged at an interval corresponding to a first wavelength a plurality of flux coupling loops, the plurality of flux coupling loops divided into a first set and a second set, each flux coupling loop having a first coupling loop portion, the first coupling loop portions arranged in the first region and along the measuring axis at an interval corresponding to a second wavelength, and a second coupling loop portion, the second coupling loop portions of the plurality of flux coupling loops extending from the first coupling loop portions across the measuring axis, the second coupling loop portions of each of the first and second sets positioned in second and third regions of the second member, respectively, and arranged along the measuring axis at an interval corresponding to the first wavelength, wherein, in response to the first changing magnetic flux:

a current is inductively generated in the first coupling loop portion of each of the plurality of flux coupling loops, the current in the first coupling loop portion of each flux coupling loop is conducted to the second coupling loop portion of that flux coupling loop, the second coupling loop portions driven with the current to generate a second changing magnetic flux in each of the second and third regions, and in response to the second changing magnetic flux, a signal is inductively generating in each of the first set of magnetic flux sensors and the second set of magnetic flux sensors;

second and third magnetic field generators, wherein, when the second and third magnetic field generators are driven with a changing current, the second and third magnetic field generators generates a third changing magnetic flux in the second and third regions of the second member, respectively;

a third set of magnetic flux sensors, the third set of magnetic flux sensors positioned adjacent the first region and extending along the measuring axis, the third set of magnetic flux sensors arranged at an interval corresponding to the second wavelength, wherein, in response to the third changing magnetic flux:

a current is inductively generated in the second coupling loop portion of each of the plurality of flux coupling loops, the current in the second coupling loop portion of each flux coupling loop is conducted to the first coupling loop portion of that flux coupling loop, the first coupling loop portions driven with the current to generate a fourth changing magnetic flux in the first region, and in response to the fourth changing magnetic flux, a signal is inductively generating in the third set of magnetic flux sensors; and a signal processing circuit that determines an absolute position of the first member relative to the second member along the measuring axis based on the signals generated in each of the first, second and third sets of magnetic flux sensors.

32. A set of inductive coupling loops for use in an absolute position inductive transducer, the set comprising a plurality of coupling loops arranged along the measuring axis of a scale element, wherein:

each coupling loop of the set comprises at least first and second portions separated from each other in a direction across the measuring axis;

for at least a sub-plurality of the plurality of coupling loops, at least the first portions of the set of coupling loops are arranged along the measuring axis at a spacing corresponding to a first scale wavelength, and at least the second portions of the set of coupling loops are arranged along the measuring axis at a spacing corresponding to a second scale wavelength; and the spatial phase relation between the first and second wavelengths is unique for every position along the measuring axis within a span including at least the sub-plurality of the plurality of coupling loops.

33. A read head element and scale element set for use in an absolute position inductive transducer, wherein:

the scale element comprises a set of inductive coupling loops, the set of inductive coupling loops comprising a plurality of coupling loops arranged along a measuring axis of the scale element;

each coupling loop of the set of inductive coupling loops comprises at least first and second portions separated from each other in a direction across the measuring axis, wherein for at least a sub-plurality of the plurality of coupling loops, at least the first portions of the sub-plurality of coupling loops are arranged along the measuring axis at a spacing corresponding to a first scale wavelength, and at least the second portions of the sub-plurality of coupling loops are arranged along the measuring axis at a spacing corresponding to a second scale wavelength, and the spatial phase relation between the first and second wavelengths is unique for every position along the measuring axis within a span including at least the sub-plurality of the plurality of coupling loops;

the read head element comprises at least first and second regions separated from each other in a direction across the measuring axis, the first region containing at least one first region transmitter winding and at least one first region flux sensor, the second region containing at least one second region transmitter winding and at least one second region flux sensor; and at least the first portions of at least the sub-plurality of the plurality of coupling loops on the scale element alignable with the first region on the read head element, and at least the second coupling loop portions of at least the sub-plurality of the plurality of coupling loops on the scale element alignable with the second region on the read head element.

34. The read head element and scale element set of claim 33, wherein the at least one flux sensor positioned in the first region produces at least one first region output signal in response to a changing current in at least one second region transmitter winding, the at least one first region output signal varying at the first wavelength for read head positions along the scale element measuring axis, and the at least one flux sensor positioned in the second region produces at least one second region output signal in response to a changing current in at least one first region transmitter winding, the at least one second region output signal varying at the second wavelength for read head positions along the scale element measuring axis.

* * * * *

UNITED STATES PATENT AND TRADEMARK OFFICE
CERTIFICATE OF CORRECTION

PATENT NO.   : 6,400,138 B1
DATED        : June 4, 2002
INVENTOR(S)  : Nils Ingvar Andermo It is certified that error appears in the above-identified patent and that said Letters Patent is hereby corrected as shown below:

Title page,
Showing the illustrative figure, should be deleted and substitute therefore the attached title page.

Drawings,
The drawing sheet, consisting of Figs. 3 and 4, should be deleted to be replaced with the drawing sheet, consisting of Figs. 3 and 4 as shown on the attached page.

UNITED STATES PATENT AND TRADEMARK OFFICE
CERTIFICATE OF CORRECTION

PATENT NO. : 6,400,138 B1
DATED : June 4, 2002
INVENTOR(S) : Nils Ingvar Andermo It is certified that error appears in the above-identified patent and that said Letters Patent is hereby corrected as shown below:

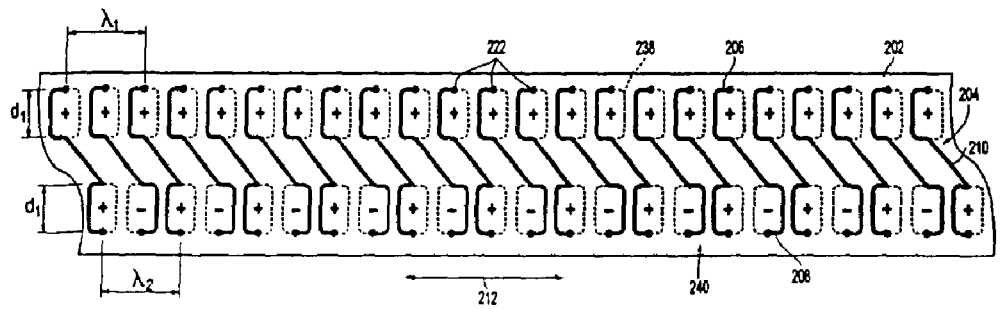

FIG. 3

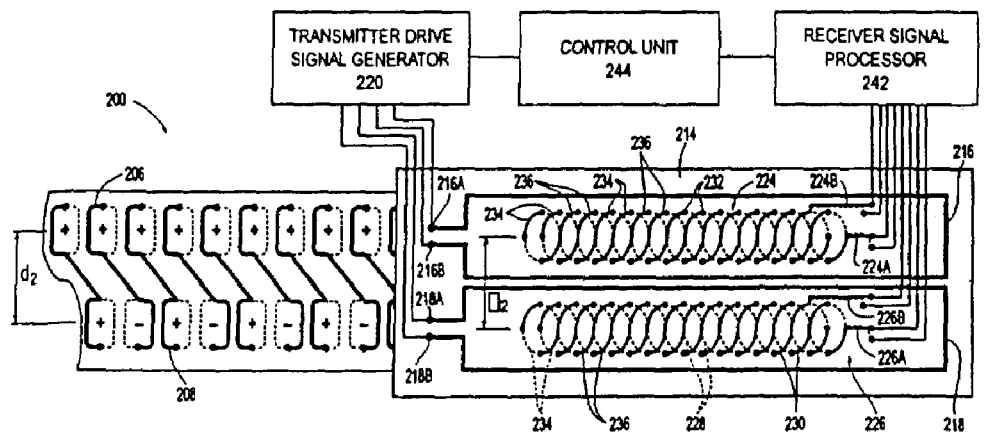

FIG. 4

Signed and Sealed this

First Day of October, 2002

*Attest:*

*Attesting Officer*

JAMES E. ROGAN
*Director of the United States Patent and Trademark Office*

United States Patent
Andermo

(10) Patent No.: US 6,400,138 B1
(45) Date of Patent: Jun. 4, 2002

(54) REDUCED OFFSET HIGH ACCURACY INDUCED CURRENT ABSOLUTE POSITION TRANSDUCER

(75) Inventor: Nils Ingvar Andermo, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/421,497

(22) Filed: Oct. 20, 1999

Related U.S. Application Data

(63) Continuation-in-part of application No. 09/213,268, filed on Dec. 17, 1998.

(51) Int. Cl.$^7$ .............................. G01B 7/14; G01B 7/02
(52) U.S. Cl. ........................ 324/207.17; 324/207.12; 324/207.24; 324/207.25; 340/870.32; 336/45
(58) Field of Search .......... 324/207.25, 207.15–207.19, 324/207.12, 207.24; 336/45, 130, 131, 129, 75, 77, 79, 115; 340/870.32, 870.33, 870.35, 870.36; 318/653–657; 341/15

(56) References Cited

U.S. PATENT DOCUMENTS

| | | |
|---|---|---|
| 4,100,485 A | 7/1978 | Rogers |
| 4,103,322 A | 7/1978 | Phillips et al. |
| 4,150,352 A | 4/1979 | Pomella et al. |
| 4,420,754 A | 12/1983 | Andermo |
| 4,697,144 A | 9/1987 | Howbrook |
| 4,893,077 A | 1/1990 | Auchterlonie |
| 5,291,782 A | 3/1994 | Taylor |
| 6,005,387 A | 12/1999 | Andermo et al. |
| 6,054,851 A | 12/1999 | Maserliez et al. |
| 6,157,188 A * | 12/2000 | Steinke ............... 324/207.17 |

FOREIGN PATENT DOCUMENTS

| | | |
|---|---|---|
| EP | 0872712 | 10/1998 |
| WO | WO 95/31696 | 11/1995 |
| WO | WO 97/19323 | 5/1997 |

OTHER PUBLICATIONS

Hitchcox, A., Assoc. Ed. "Linear Transducers for Position Feedback: The Variety of Designs Available Means One Is Probably Just Right For Your Application.".
"Farrand INDUCTOSYN Positions Transducers" Brochure.
"Heidenhain–Linear–Inductosyn" Brochure, Nov. 1988.

* cited by examiner

Primary Examiner—Jay Patidar
(74) Attorney, Agent, or Firm—Oliff & Berridge, PLC.

(57) ABSTRACT

A reduced offset absolute position transducer has at least one magnetic field generator that generates a first changing magnetic flux in a first flux region. A plurality of coupling loops have a first plurality of coupling loop portions spaced at a first wavelength along a measuring axis and a second plurality of coupling loop portions spaced at a second wavelength along a measuring axis. One of the first plurality of coupling loop portions and the second plurality of coupling loop portions are inductively coupled to a first changing magnetic flux from a transmitter winding in a first flux region to generate a second changing magnetic flux outside the first flux region in the other of the first plurality of coupling loop portions and the second plurality of coupling loop portions. A magnetic flux sensor is positioned outside the first flux region and is responsive to the second changing magnetic flux to generate a position-dependent output signal. The output signal varies at the first or second wavelength of the corresponding other of the first plurality of coupling loop portions and the second plurality of coupling loop portions that generates the second changing magnetic flux.

34 Claims, 11 Drawing Sheets